United States Patent
Akizuki et al.

[11] Patent Number: 5,490,718
[45] Date of Patent: Feb. 13, 1996

[54] SEAT CUSHION STRUCTURE FOR USE IN A FRONT SEAT

[75] Inventors: Kenichiro Akizuki; Hiroharu Suenaga, both of Toyota; Masaki Hayashi, Aichi, all of Japan

[73] Assignees: Toyota Jidosha Kabushiki Kaisha; Araco Kabushiki Kaisha, both of Toyota, Japan

[21] Appl. No.: 396,862

[22] Filed: Mar. 1, 1995

Related U.S. Application Data

[63] Continuation of Ser. No. 995,201, Dec. 22, 1992, abandoned.

[30] Foreign Application Priority Data

Dec. 26, 1991 [JP] Japan ................... 3-345075
Mar. 17, 1992 [JP] Japan ................... 4-060692

[51] Int. Cl.$^6$ ........................................ A47C 7/02
[52] U.S. Cl. ................ 297/452.49; 297/452.21; 297/452.52
[58] Field of Search ........... 297/452.18, 452.21, 297/452.49, 452.52

[56] References Cited

U.S. PATENT DOCUMENTS 4,682,763 7/1987 Kazaoka et al. .

FOREIGN PATENT DOCUMENTS

| | | | |
|---|---|---|---|
| 2562003 | 3/1984 | France | 297/284.11 |
| 2546826 | 12/1984 | France | |
| 3510274 | 10/1985 | Germany | |
| 3633035 | 4/1987 | Germany | 297/440.21 |
| 56117850 | of 0000 | Japan | |
| 5562256 | 10/1953 | Japan | |
| 56044059 | 9/1979 | Japan | |
| 58-141108 | 8/1983 | Japan | |
| 60-175147 | 11/1985 | Japan | |
| 60-256411 | 12/1985 | Japan | |
| 63-24909 | 2/1988 | Japan | |
| 63-29460 | 2/1988 | Japan | |
| 1121451 | 8/1989 | Japan | |
| 412964 | 3/1992 | Japan | |
| 4123144 | 11/1992 | Japan | |

*Primary Examiner*—C. D. Crowder
*Assistant Examiner*—Bibhu Mohanty
*Attorney, Agent, or Firm*—Cushman, Darby & Cushman

[57] ABSTRACT

A seat cushion of a vehicle front seat, including a cushion panel and a cushion frame, in which the cushion panel and the cushion frame are elastically held together in close proximity to a front edge portion of the cushion panel by means of a torsion spring, and are connected together at a rear portion of the cushion panel by a pair of rear-linking members which is subjected to an urging force in a tension direction by a pair of tension springs. Thus, the seat cushion can be formed with a simplified spring arrangement, and provides easy tuning of these springs because the tension spring exhibits a linear spring characteristic. Furthermore, the seat cushion eliminates pitching because the cushion frame and the cushion panel are connected together at the rear portion thereof behind a hip point of an occupant who is seated in the front seat. Moreover, the seat cushion provides a wider space for an occupant seated in the rear of a vehicle to stretch his legs.

37 Claims, 18 Drawing Sheets

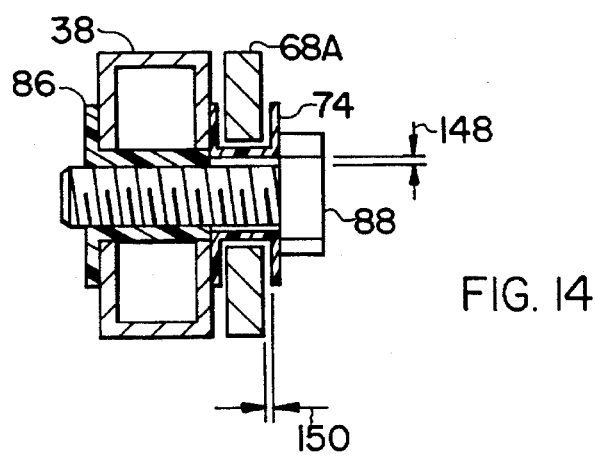
FIG. 14
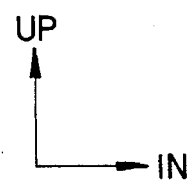
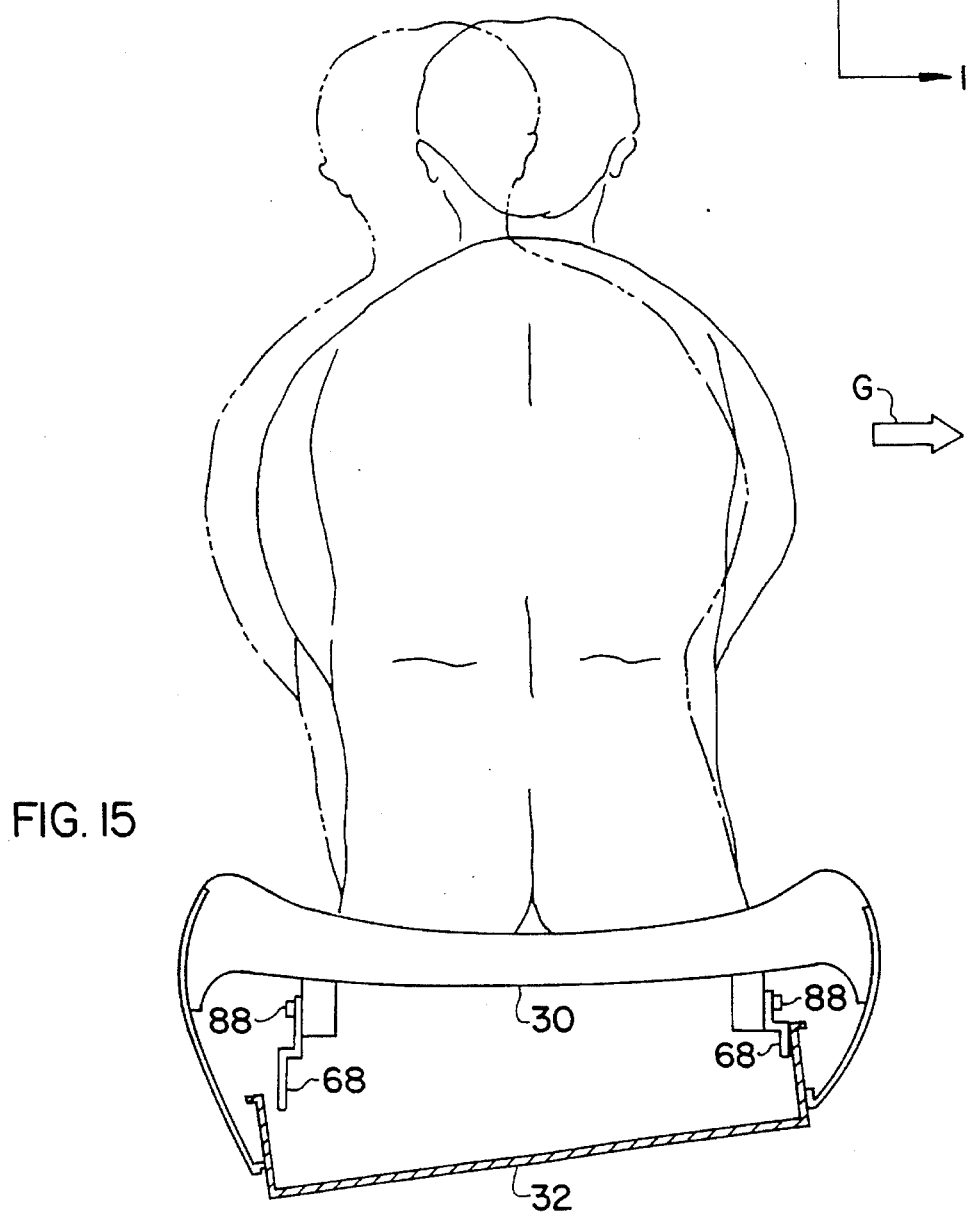
FIG. 15

SEAT CUSHION STRUCTURE FOR USE IN A FRONT SEAT

This is a continuation of application Ser. No. 07/995,201, filed on Dec. 22, 1992, which was abandoned upon the filing hereof.

BACKGROUND OF THE INVENTION

1. Field of the Invention

The present invention relates to a seat cushion structure for use in a vehicle front seat.

2. Background Information

A seat cushion for use in a front seat generally includes: a cushion portion, which is formed by a cushion pad on which an occupant is seated; and, a cushion frame, which extends around the outer-lower periphery of the cushion portion so as to form a frame member of the seat cushion. In addition, the cushion frame is provided with several different springs, which span the cushion frame in order to increase cushion-ability of the seat cushion. For one example of this structure, reference is made to Japanese Utility Model Application Laid-Open No. 63-29460.

FIG. 19 illustrates a seat cushion structure disclosed in the above application, which includes sinusoidal springs 200 and a pair of compression-coiled springs 202. The sinusoidal springs 200 span substantially the entire underside of a seat cushion 204. The compression-coiled springs 202 are positioned at a point corresponding to the hip joint of an occupant who is seated on the seat cushion (This position will hereinafter be referred to as a "hip point.")

In a seat cushion structure of this type, however, the different types of springs the sinusoidal spring 200 and the compression-coiled spring 202 in the above case are arranged in an intricate manner. Accordingly, problems with such a spring arrangement lie in that it is difficult to identify how each of the springs again, the sinusoidal spring 200 or the compression-coiled spring 202 in the above case exercises a cushion-ability effect on the entire seat cushion 204, and thus tuning (i.e., adjustment) of these springs is difficult to carry out.

SUMMARY OF THE INVENTION

In view of the above-described fact, an object of the present invention is to provide a seat cushion structure for use in a vehicle front seat, in which easy tuning of springs is achievable.

The seat cushion structure according to the present invention comprises: a cushion portion, on which an occupant sits; a supporting panel, which is curved into a predetermined shape so as to form a surface for supporting the occupant seated on the cushion portion, the supporting panel being overlaid with the cushion portion such that the supporting panel and the cushion portion are assembled together; a supporting member, which extends around the outer-lower periphery of the cushion portion so as to support the supporting panel; a first connecting device, which elastically connects between the supporting member and the supporting panel in the vicinity of a front edge portion of the supporting panel; a pair of second connecting devices being swingably disposed respectively about a fulcrum thereof which is positioned at an intermediate portion of the second connecting device, wherein one end portion of the second connecting device is connected to each side portion of the supporting panel at a location in a rearward direction of the vehicle front seat from a hip point, the other end portion of the second connecting device being subjected to an urging force in a tension direction; and, a first urging device disposed between the second connecting device and the supporting member to urge the other end portion of the second connecting device.

According to the present invention with the above construction, when the occupant is seated on the cushion portion, an occupant's weight is applied to the supporting panel, which is overlaid with the cushion portion such that they are combined together. The supporting panel is curved into a desired shape in order to form a supporting surface for a seated occupant. A feeling of greater comfort is thereby produced when compared with another supporting panel which is made of, for example, a planar plate member and the like. In addition, the supporting panel and the supporting member are elastically held together in close proximity to the front edge portion of the supporting panel by means of the first connecting device. Furthermore, the second connecting device is connected to each side portion of the supporting panel at a location in the rearward direction of the vehicle, whereby the supporting panel is elastically connected to the supporting member via the first urging device. The entire supporting panel is thereby elastically supported by the supporting member. In addition, the first urging device, which is used in union with the second connecting device, has an urging force acting in a tension direction. That is, the first urging device exhibits a linear spring characteristic in accordance with Hooke's law. This makes it easier to observe the way in which the first urging device in use exercises an effect on the entire seat cushion due to the spring characteristic of the first urging device than the use of a different urging device, such as a compression-coiled spring and the like, which provides a non-linear spring characteristic associated with its urging force in a compression direction. As a result, easy tuning of the first urging device is achievable.

An urging device, which involves the urging force acting in the compression direction, must inevitably be disposed under a hip point of a seated occupant. However, the first urging device according to the present invention need not be because the first urging device has an urging force acting in the tension direction. This provides a high degree of freedom of layout, so that the first urging device can be positioned, for example, at each side portion of the supporting panel. As a consequence, a space under the seat cushion, or rather beneath the supporting panel is made available, thereby allowing an occupant seated in the rear of the vehicle to further stretch his legs therein.

The one end portion of the second connecting device is connected to each side portion of the supporting panel at a location in the rearward direction of the vehicle from the hip point of the occupant seated on the cushion portion. The supporting panel is thereby prevented successfully from resonating with the sway of the occupant in a longitudinal direction of the vehicle or vibrations imparted to a vehicle body from a rough roadway when the vehicle runs thereon, as compared with the above Connected location between the supporting panel and the second connecting device being coincident with, for example, the hip point. As a consequence, the supporting panel can be prevented from swinging about a transverse axis of the vehicle body. (This phenomenon will hereinafter be referred to as "pitching.")

A seat cushion structure according to a second aspect of the present invention further comprises a shaft-shaped member, which spans between the fulcrums of the pair of second connecting devices.

According to the second aspect of the present invention with the above construction, the pair of second connecting devices is connected together via the shaft-shaped member, of which a shaft axis corresponds with a line extending between the fulcrums of the pair of second connecting devices. When the vehicle takes a curve in the road, an occupant's center of gravity is relatively displaced by inertial force which acts on the occupant, so that deflection will occur at the fulcrums (i.e., a central point of swing) of each of the second connecting devices. As a result, the supporting panel and yet the surface of the seat cushion tend to swing a small amount about a longitudinal axis of the vehicle body. (This phenomenon will hereinafter be referred to as "rolling.") However, this rolling can be avoided by the pair of second connecting devices having the shaft-shaped member.

Furthermore, a seat cushion structure according to a third aspect of the present invention comprises a first connecting device which includes a torsion spring and at least one movable piece, the at least one movable piece being positioned at a location where the torsion spring is urged into contact with the supporting panel, whereby the at least one movable piece is held in the vicinity of the front edge portion of the supporting panel so as to be slidable in response to a quantity of elastic deformation of the torsion spring.

According to the third aspect of the present invention with the above construction, the first connecting device includes the torsion spring and the movable piece. The movable piece is fitted to the torsion spring at a location where the torsion spring is urged into contact with the supporting panel. The movable piece is thereby retained in the vicinity of the front edge portion of the supporting panel so as to be slidable depending upon an amount of elastic deformation of the torsion spring.

When the occupant is seated on the cushion portion, the torsion spring will deform elastically according to an occupant's weight. At the same time, the movable piece is slid by the amount of elastic deformation of the torsion spring, which results in less resistance to swing than when the torsion spring is urged into direct contact with the supporting panel in close proximity to the front edge of the supporting panel. The movable piece can thereby be moved smoothly in the vicinity of the front edge portion of the supporting panel. As a consequence, the front seat acquires increased cushion ability around a front portion of the cushion portion.

According to a fourth aspect of the present invention, a seat cushion structure for use in a vehicle seat includes a cushion portion on which an occupant sits; links supporting the cushion portion so that the cushion portion is freely movable in vertical directions of a vehicle; a supporting member supporting the cushion portion via the links; and urging means for applying tensile force to areas between respective predetermined areas of the links and a predetermined area of the supporting member so that the cushion portion is urged upward via the links.

BRIEF DESCRIPTION OF THE DRAWINGS

FIG. 14 is a cross-sectional view taken along line 14—14 of FIG. 13;

FIG. 15 is a descriptive illustration, showing a state in which rolling has occurred at each connecting structure which is shown in FIGS. 13 and 14;

DESCRIPTION OF THE PREFERRED EMBODIMENTS

A seat cushion structure for use in a front seat according to a first embodiment of the present invention will now be described with reference to FIG. 1 through FIG. 5. Note that arrows "FR", "UP", and "IN" shown in the accompanying drawings respectively represent: the forward direction of a vehicle; the upward direction thereof; and, an inward direction thereof relative to a transverse axis of the vehicle.

Figure 1:
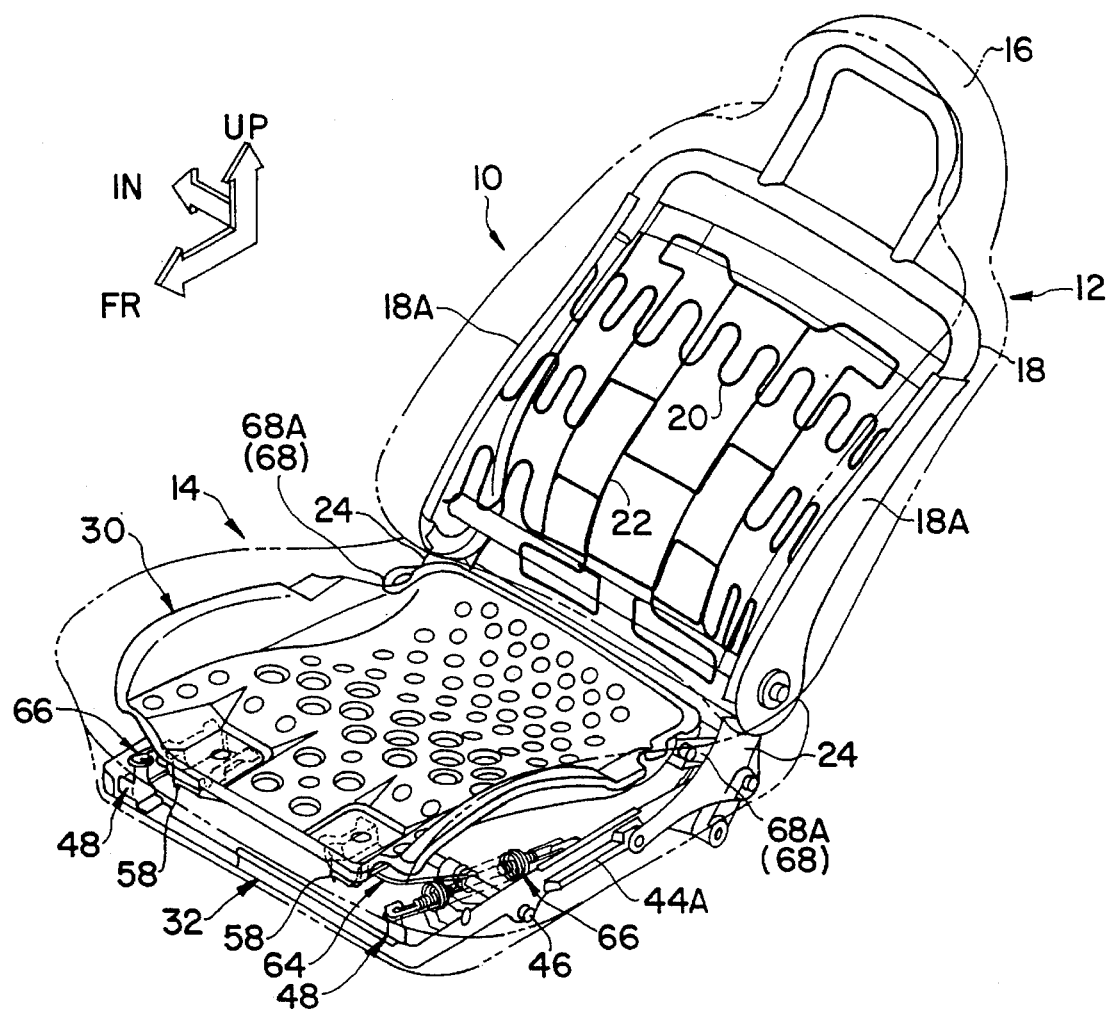
FIG. 1 is a perspective view, illustrating a front seat which uses a seat cushion structure in accordance with a first embodiment of the present invention.

FIG. 1 illustrates a front seat 10 which includes: a seat back 12 for supporting the back of an occupant; a seat cushion 14 for supporting the buttocks; and, a head rest 16 for supporting the head. A seat back frame 18, which has a substantially frame shape, is disposed within the seat back 12 so as to support the seat back 12. The seat back frame 18 is provided with different types of back springs 20 and 22 which span the seat back frame 18. The seat back frame 18 is swingably connected to a hinged plate 24 at a lower end portion of each side portion 18A of the seat back frame 18. The hinged plate 24 is mounted at a rear end portion of each side portion 44A of a cushion frame 32, of which details are found hereinafter in the appropriate description. The seat back 12 is thereby permitted to incline in relation to the seat cushion 14.

Next, a configuration of the seat cushion 14 will be described in detail.

Figure 2:
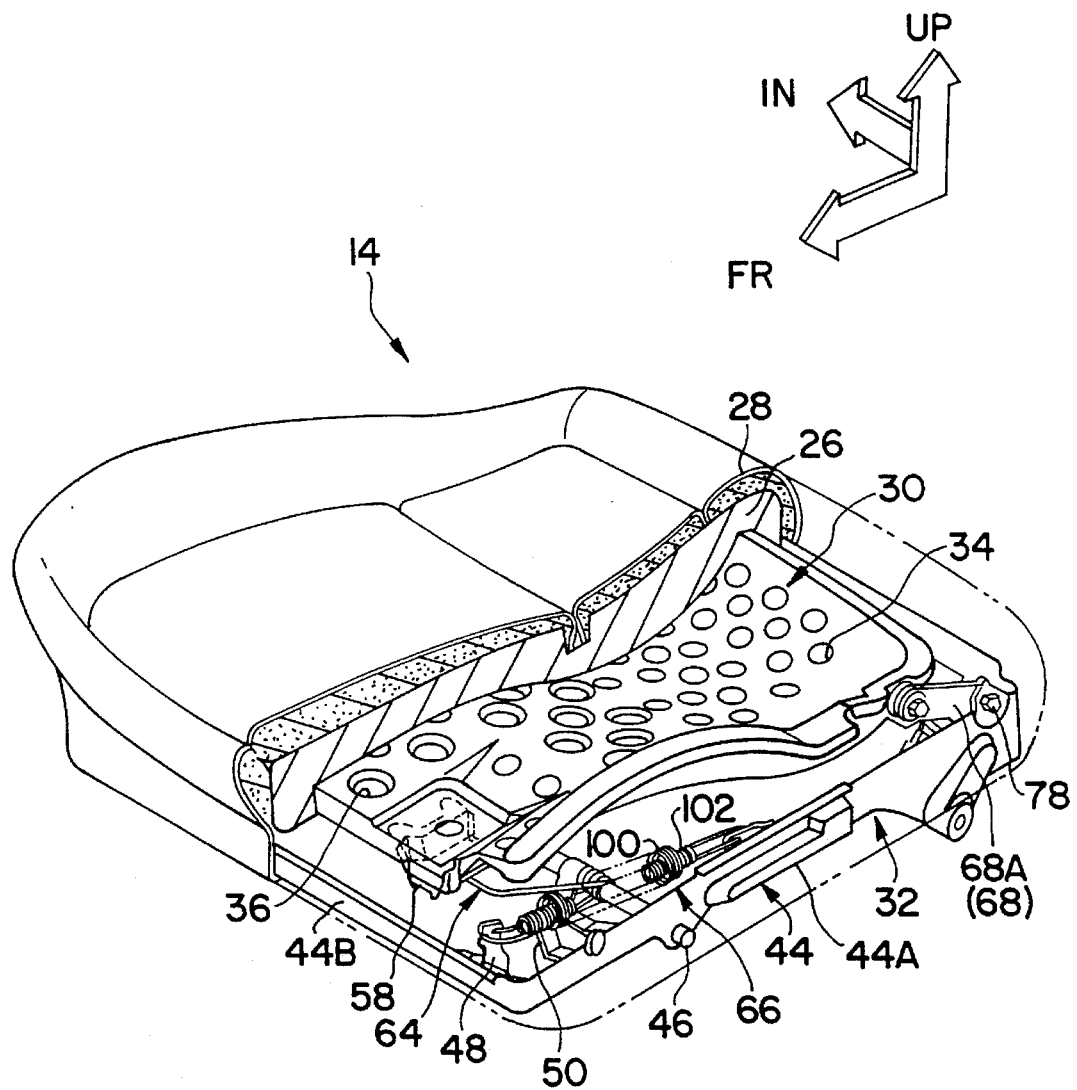
FIG. 2 is a perspective view, illustrating the seat cushion structure of FIG. 1, but with a cushion pad incorporated therein.

Referring to FIG. 2, the seat cushion 14 is formed of: a cushion pad 26, which forms a cushion portion, an upper surface thereof being covered with a cushion cover 28; a cushion panel 30, which acts as a supporting panel, the cushion panel 30 being overlaid with the cushion pad 26 such that these two members are combined together; and, a cushion frame 32, which serves as a supporting member, the cushion frame 32 and the cushion panel 30 being connected together. Further description will be given in this order.

Figure 3:
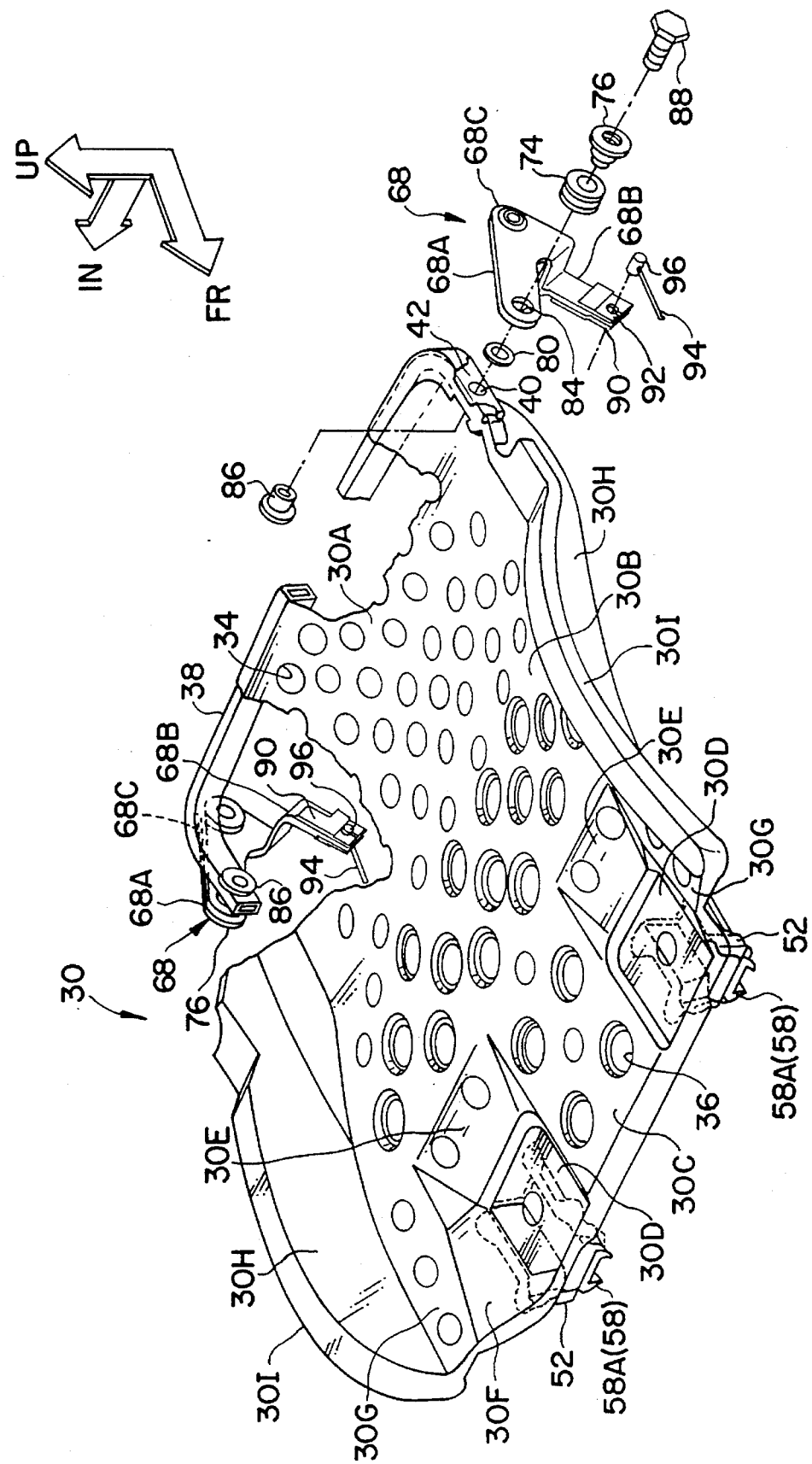
FIG. 3 is a partly exploded perspective view, showing a cushion panel of FIG. 2 along with an arrangement for connecting the cushion panel and a pair of rear-linking members.

Referring to FIG. 3, the cushion panel 30 is formed by a plate member being bent into a desired shape. The cushion panel 30 includes a rear concave portion 30A, which has a predetermined radius of curvature that varies gradually. The rear concave portion 30A is formed with a plurality of lightening holes 34 so as to make the portion 30A lighter. The cushion panel 30 further includes an intermediate convex portion 30B which extends continuously from a front edge portion of the rear concave portion 30. The intermediate convex portion 30B has an arcuate surface which is smoother than that of the rear concave portion 30A. The intermediate convex portion 30B is formed with a plurality of lightening holes 36, with each diameter of the lightening holes 36 being larger than that of the lightening holes 34 of the rear concave portion 30A. When an occupant is seated on the seat cushion 14, a hip point of the occupant is located substantially between the intermediate convex portion 30B and the rear concave portion 30A, but slightly offset toward the latter.

In addition, the cushion panel 30 includes a front-central planar portion 30C, which extends continuously from a front edge portion of the intermediate convex portion 30B. The front-central planar portion 30C also has a surface defined with the lightening holes 34 and 36 therein. At each side of the front-central planar portion 30C, a square-shaped planar portion 30D is formed on a plane which is lower than the front-central planar portion 30C. The pair of square-shaped planar portions 30D and the intermediate convex portion 30B are combined together via a pair of beveled portions 30E, which is formed therebetween so as to slope at a given angle down to the pair of square-shaped planar portions 30D. The outer side edges of the square-shaped planar portions 30D gradually slant outwardly in a stepped manner, forming beveled portions 30F and 30G.

The cushion panel also includes a peripheral convex wall portion 30H, which has a slightly convex shape. The peripheral convex wall portion 30H is oriented upwardly at a predetermined angle in relation to the outer-peripheries of: the rear concave portion 30A; the intermediate convex portion 30B; and, a pair of beveled portions 30G. The peripheral convex wall portion 30H thereby extends continuously therefrom. In addition, the cushion panel 30 includes a flange portion 30I, which extends from the outer-periphery of the peripheral convex wall portion 30H by being bent therefrom so as to have a rectangular-shaped cross-section.

The flange portion 30I of the cushion panel 30, which is curved into such a desired shape, is fitted with a reinforcing member 38 at a rear edge portion of the flange portion 30I. The reinforcing member 38 has a rectangular-shaped cross-section in a plane perpendicular to a longitudinal axis of the reinforcing member 38, and assumes a substantially rectangular shape when viewed from the top thereof. A through-hole 40 is punched both at each end portion of the reinforcing member 38 and at a corresponding portion of the flange portion 30I, in such a way that the through-hole 40 of the former portion is axially aligned with that of the latter portion. A concave portion 42 extends around the through-hole 40 of the flange portion 30I.

A structure of the cushion frame 32 will now be described.

Figure 4:
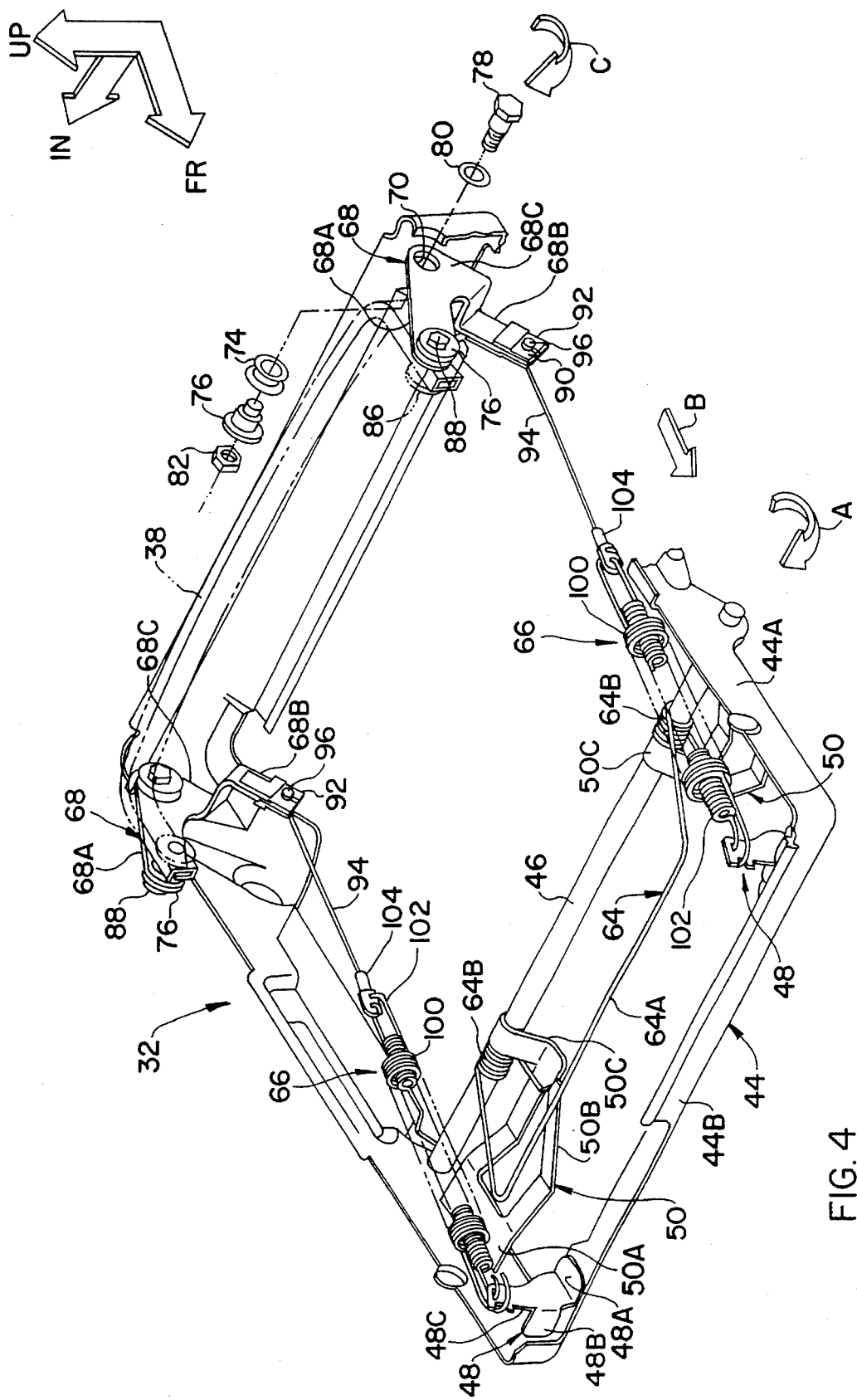
FIG. 4 is a perspective view, showing a cushion frame of FIG. 2.

Referring to FIG. 4, the cushion frame 32 includes a frame body 44 which is formed into a rectangular frame. The frame body 44 is provided with a rod 46, a pair of spring-holding portions 48, and a pair of spring-holding plates 50, each of which will be described in turn.

The rod 46 in the form of a linear bar is positioned between a front edge portion and a central portion of each side portion 44A of the frame body 44 in a longitudinal direction thereof so as to span between side portions 44A of the frame body 44. At a front edge portion 48B of the frame body 44, a pair of spring-holding portions 48 is positioned upright in close proximity to the side portions 44A of the frame body 44. Each of the spring-holding portions 48 includes two mounting surfaces 48A and 48B and one holding portion 48C. The mounting surfaces 48A and 48B are mounted respectively to a base surface and a vertical surface of the front edge portion 44B of the frame body 44. The holding portion 48C extends upward so as to be integrally combined with the mounting surfaces 48A and 48B. A circular hole and a U-shaped notch are formed respectively at a central portion and a front edge portion of an upper end portion of the holding portion 48C.

Spring-holding plates 50 are disposed between the spring-holding portions 48 and the rod 46, with base portions 50A of the spring-holding plates 50 being secured to the side portions 44A of the frame body 44. The base portions 50A are formed of planar plate members having a rectangular shape. Each of the spring-holding plates 50 includes a pair of intermediate portions 50B which anchor at different spots at one edge portion of each of the base portions 50A in a longitudinal direction of the base portions 50A. The pairs of intermediate portions 50B extend therefrom in an inward direction of the frame body 44 until the pairs of portions 50B intersect at a location adjacent to an intermediate portion of the rod 46 and in an axial direction of the rod 46. Hook-shaped arm portions 50C are integrally formed at inner edge portions of the respective intersections of the pairs of intermediate portions 50B. The arm portion 50C extends therefrom to the rod 46 so as to be elastically held against a circumferential surface of the rod 46.

Next, the structure for connecting the cushion panel 30 and the cushion frame 32 will be described in detail. The cushion panel 30 and the cushion frame 32 are held together at front and rear portions of the cushion panel 30. Thus, descriptions will be given initially for a front-connecting structure and thereafter for a rear-connecting structure.

Figure 5:
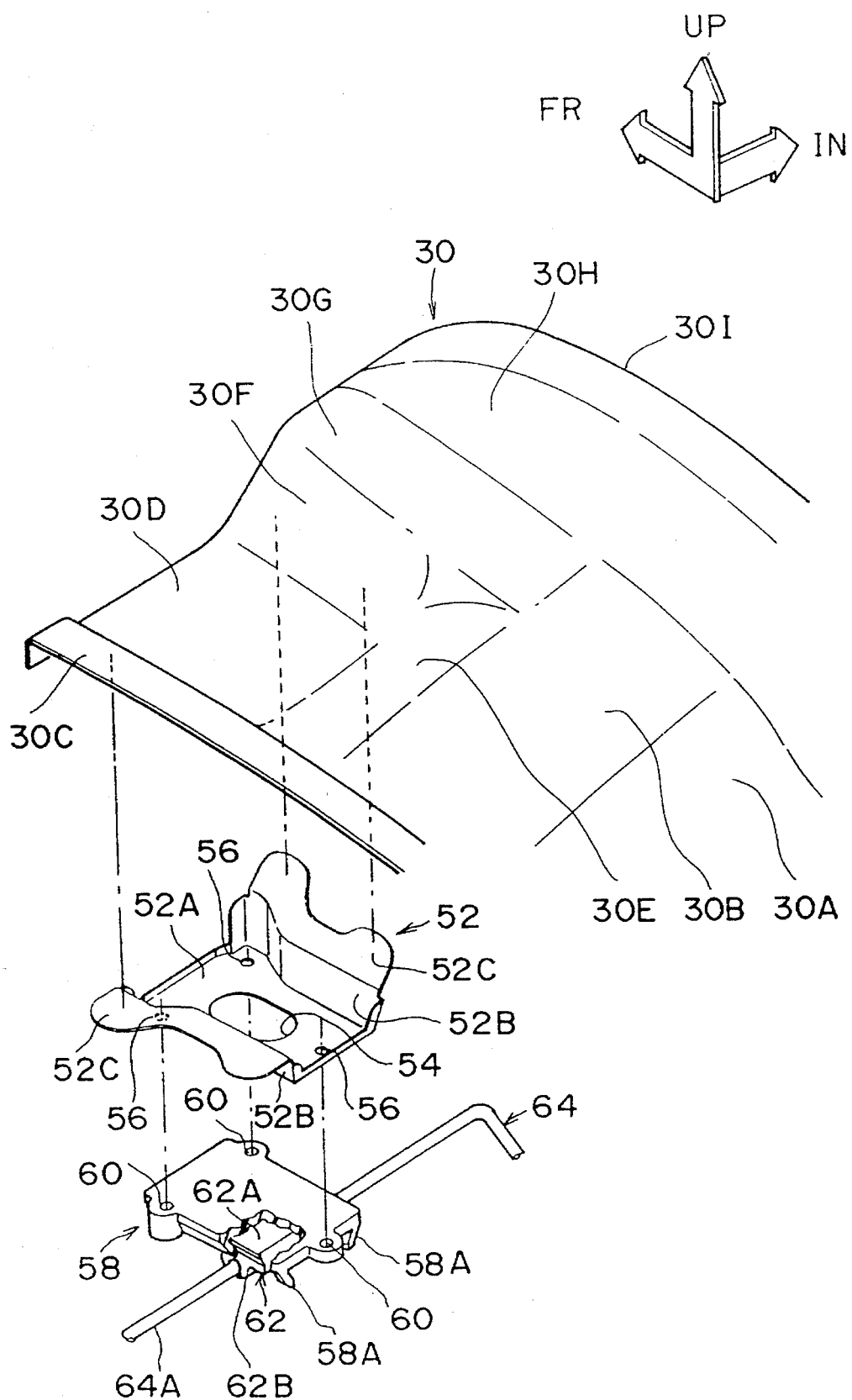
FIG. 5 is a partly exploded perspective view, illustrating an arrangement for connecting a torsion spring of FIG. 4 and the cushion panel of FIG. 3.

FIG. 5 illustrates the cushion panel 30 in which each square-shaped planar portion 30D is provided with a metal bracket 52 on the reverse side thereof. Note that FIG. 5 shows the cushion panel 30 taken along the center line thereof without lightening holes 34 and 36.

The metal bracket 52 includes a base portion 52A, which has a substantially rectangular shape when viewed from the top thereof. Opposite side portions of the base portion 52A are bent in the same direction (i.e., in the upward direction of a vehicle) so as to form a pair of upright portions 52B. Upper end portions of the pair of upright portions 52B are bent at a predetermined angle which corresponds with rakish angles of a pair of beveled surfaces 30F of the cushion panel 30. The upper end portions of the upright portions 52B are thereby directed in a direction in which these are spaced apart from each other, to form a pair of tacking portions 52C. The pair of tacking portions 52C is then spot-welded to the pair of beveled surfaces 30F of the cushion panel 30, so that the metal bracket 52 is anchored to the reverse of a pair of square-shaped planar portions 30D of the cushion panel 30. As a consequence, the cushion panel 30 acquires increased rigidity in the vicinity of the pair of square-shaped planar portions 30D. The base portion 52A of the metal bracket 52 is formed with an elliptical hole 54 at a central portion thereof so as to make the metal bracket 52 lighter. In addition, rivet holes 56 are punched at three locations around the elliptical hole 54.

A slide base 58 is sealed on the reverse side of the base portion 52A of the metal bracket 52. The slide base 58, which is formed of a resin material, has a rectangular shape when viewed from the top thereof. Note that FIG. 5 shows a partially cutaway portion of the slide base 58. The slide base 58 is also formed with rivet holes 60, which are axially aligned with the rivet holes 56 of the metal bracket 52, so that the slide base 58 and the metal bracket 52 are coupled together via unillustrated rivets. The slide base 58 includes a pair of rail portions 58A at opposite side portions thereof. The pair of rail portions 58A is bent at an acute angle with respect to the slide base 58 in the inward direction thereof. A slider 62, which is made of a resin material, is held between the pair of rail portions 58A.

The slider 62 includes: a base portion 62A made of a planar plate member, which has a square shape when viewed from the top thereof; and, a hook portion 62B, which is integrally formed at a central portion of the reverse of the base portion 62A. Both side portions of the base portion 62A taper at an acute angle of a predetermined value with respect to the base portion 62A, so that the base portion 62A is slidable on the pair of rail portions 58A in the longitudinal direction of the vehicle. The hook portion 62B is shaped into an arcuate claw, of which elastic deformation allows the hook portion 62B to grasp a linear portion 64A of a torsion spring 64, of which details will be given below.

Referring to FIG. 4, a torsion spring 64 is disposed inside the cushion frame 32. The torsion spring 64 includes: a linear portion 64A, which has a substantially rectangular shape when viewed from the top thereof; and, a pair of coiled portions 64B, which is formed at opposite end portions of the linear portion 64A in the rearward direction of the vehicle. As previously described, the linear portion 64A is elastically held against the hook portion 62B of the slider 62 in close proximity to both end portions of the linear portion 64A in an axial direction thereof (i.e., in a transverse direction of the cushion frame 32.) Furthermore, each of the pair of coiled portions 64B is wound around the rod 46 at a location adjacent to an arm portion 50C of each spring-holding plate 50, the arm portion 50C being held against the rod 46 in the vicinity of each end portion of the rod 46 in the axial direction of the rod 46. In addition, one end portion of each of the pair of coiled portions 64B is elastically held against a pair of intermediate portions 50B of the spring-holding plate 50. The torsion spring 64 thereby forces the cushion panel 30 to move about the rod 46 in the direction of arrow A of FIG. 4, via the slider 62 and the metal bracket 52. That is, the cushion panel 30 and the cushion frame 32 are elastically held together at the front portion of the cushion panel 30 by means of the torsion spring 64.

Note that the above-described members, i.e., the slide base 58, the slider 62, and the torsion spring 64 herein correspond to a first connecting means according to the present invention.

The cushion panel 30A and the cushion frame 32 are connected together at the rear portion of the cushion panel 30A by means of a pair of rear-linking members 68 via a pair of tension springs 66, and so on, which are shown in FIG. 4.

The rear-linking member 68 has a substantially L-shaped profile when viewed from the side thereof. The rear-linking member 68 includes one end portion 68A, the other end portion 68B, and a root end portion 68C at which the former two portions intersect. A through-hole 70 is punched both at the root end portion 68C of the rear-linking member 68 and at each side portion 44A of the frame body 44 of the cushion frame 32 (the through-hole of the latter not being shown herein) in such a way that the through-hole 70 of the former portion is axially aligned with that of the latter portion. Then, a collar 74, of which rims are partly formed with sifts, is fitted in the through-hole 70 from the inside of the cushion frame 32. A hollow bush 76, which has a cylindrical shape, is then fitted in the collar 74 so as to be axially aligned with the collar 74. Furthermore, a stepped bolt 78 is inserted therethrough via a flat washer 80 from the outside of the cushion frame 32 so as to engage a nut 82 inside the cushion frame 32. This arrangement allows the rear-linking member 68 to freely pivot on the stepped bolt 78 around a circumferentially smooth surface of the stepped bolt 78.

Referring to FIG. 3, one end portion 68A of the rear-linking member 68 is formed with a through-hole 84, into which a collar 74 and a bush 76 are fitted from the outside of the cushion panel 30. From the inside of a reinforcing member 38, a bush 86 is fitted into the through-hole 40 of each end portion of the reinforcing member 38. The bush 86 is formed with a female screw thread portion at an inner-circumferential surface thereof. Furthermore, a flat washer 80 is interposed between the one end portion 68A of the rear-linking member 68 and a concave portion 42 of the cushion panel 30. As such, a bolt 88 is screwed therein via the bush 76 and the collar 74 from the outside of the cushion panel 30. The one end portion 68A of the rear-linking member 68 is thereby pivotably connected to the reinforcing member 38 of the cushion panel 30 at a predetermined distance (preferably some 50 mm) in the rearward direction of the vehicle from the above-described hip point of a seated occupant.

Referring back to FIG. 4, the other end portion 68B of the rear-linking member 68 is cranked in the inward direction of the cushion frame 32 so as to avoid interrupting the side portion 44A of the frame body 44 of the cushion frame 32. A spring-holding bracket 90 is fitted in the other end portion 68B of the rear-linking member 68 by spot-welding. An upper edge portion and a front edge portion of the spring-holding bracket 90, each of which extends in a longitudinal direction and a transverse direction of the spring-holding bracket 90 respectively, remain open because the spring-holding bracket 90 is formed by a pair of side plate members. The pair of side plate members of the spring-holding bracket 90 is formed with a keyhole-shaped interlocking hole 92 at front end portions thereof. A fixing portion 96, which has a cylindrical shape, is fitted in the interlocking hole 92. The fixing portion 96 is fixedly secured to one end portion of a wire 94 of the tension spring 66 which acts as an urging means. A gap between these two plate members of the spring-holding bracket 90 is slightly larger than the diameter of the wire 94 which is secured to the fixing portion 96. As a consequence, the fixing portion 96 is provided within the interlocking hole 92 so as to allow stable rotation of the fixing portion 96 therein, with the wire 94 being positioned between the pair of side plate members of the spring-holding bracket 90.

The tension spring 66 is formed of concentrically dual springs, which include an outer-coiled spring 100 and an inner-coiled spring 102. The coil diameter and the wire diameter of the outer-coiled spring 100 are larger than those of the inner-coiled spring 102.

The outer-coiled spring 100 includes: a front-hooking portion, which is held against the previously-noted U-shaped notch of the holding portion 48C of the spring-holding portion 48; and, a rear-hooking portion, which is held against an elongated hole of a piece 104, the elongated hole being formed at an intermediate portion of the piece 104 in the longitudinal direction thereof. The other end of the above-mentioned wire 94 is fixed to a rear edge portion of the piece 104. The inner-coiled spring 102 includes: a front-hooking portion, which is held against a circular hole that is formed at the holding portion 48A of the spring-holding portion 48; and, a rear-hooking portion, which is held against a circular hole that is formed at a front end portion of the piece 104.

In this way, the outer-coiled spring 100 and the inner-coiled spring 102 are integrally combined into a tension spring 66. The tension spring 66 then imparts an urging force, which acts in a tension direction of arrow B of FIG. 4, to the other end portion 68B of the rear-linking member 68. The rear-linking member 68 is thereby urged in the direction of arrow C of FIG. 4, in which the cushion panel 30 is forced upward, about the stepped bolt 78 which is held at the root end portion 68C of the rear-linking member 68. The tension spring 66 is set to exert greater tension than the above-described torsion spring 64.

In the tension spring 66 which is formed by such dual springs, the overall coil diameter, i.e., the outer diameter of the outer-coiled spring 100 can be made smaller. (In case a tension spring is formed by a single coiled spring, and is attempted to exert the same degree of tension as the above, this tension spring must have a greater coil diameter.) Furthermore, fine tuning can be accomplished by an increased or decreased number of times of winding for forming the inner-coiled spring 102 which has a smaller wire diameter. As a consequence, the tension spring 66 can be tuned within fine limits.

Note that the above-described members, i.e., the tension spring 66 (which acts as an urging means), the rear-linking member 68, the stepped bolt 78, and the bolt 88, herein correspond to a second connecting means in accordance with the present invention.

The operation of the present embodiment will now be described.

First, cushion ability, namely, spring tuning the seat cushion 14 of the front seat 10 will be detailed.

Cushion ability is determined according to the tension of the torsion spring 64 as well as the tension spring 66. However, neither of them interact with each other. Therefore, it is only necessary to consider respective urging forces, which are imparted to the cushion panel 30 by the torsion spring 64 and tension spring 66. This makes it easier to identify the way in which each of the springs exercises an effect on the seat cushion 14 than in other spring arrangements in which several types of springs interact with each other.

Furthermore, the cushion panel 30 and the cushion frame 32 are connected together at the rear portion of the cushion panel 30 via the tension spring 66, which has an urging force acting in a tension direction. The tension spring 66 thereby exhibits a linear spring characteristic, which provides easier spring tuning than in other spring arrangements using a compression-coiled spring and the like which exhibits a nonlinear spring characteristic. Moreover, the tension spring 66 is formed by dual springs which include the outer-coiled spring 100 and the inner-coiled spring 102. Accordingly, the tension spring 66 can be tuned within fine limits by an increased or decreased number of windings for forming a coiled portion of the inner-coiled spring 102.

With such desired tuning as conducted above, the cushion panel 30 is urged into the upward direction of the vehicle because the urging forces of the torsion spring 64 and the tension spring 66 are imparted thereto.

Figure 6:
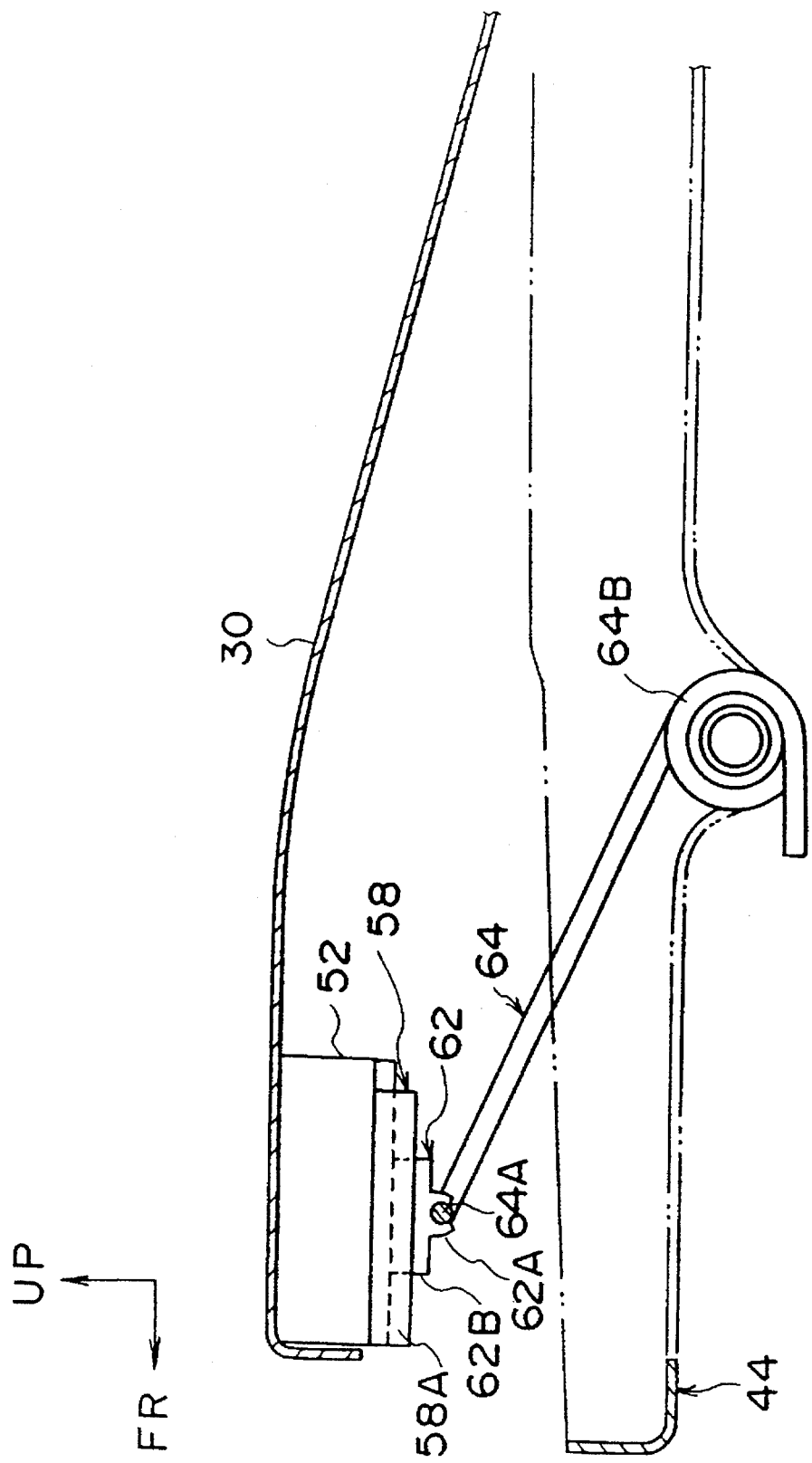
FIG. 6 is an end view, illustrating a slider of FIG. 5 in a non-sliding state.
Figure 7:
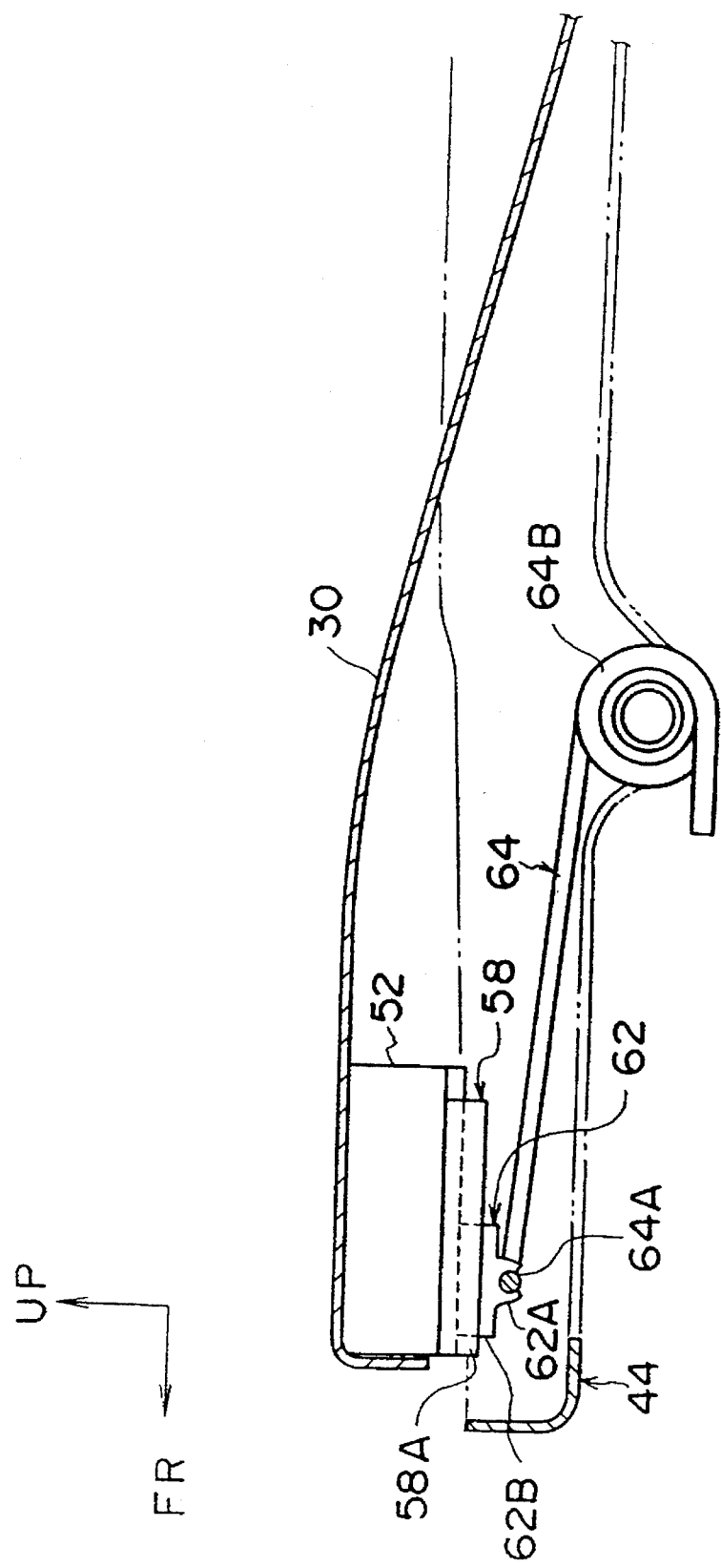
FIG. 7 is an end view, illustrating the slider of FIG. 6, but which has slid on a slide base from a state shown in FIG. 6.

When an occupant is seated on the seat cushion 14 in this state, an occupant's weight causes the rear-linking member 68 to pivot around the stepped bolt 78 of the root end portion 68C thereof in a direction opposite to arrow C of FIG. 4, against the urging force of the tension spring 66. At the same time, the torsion spring 64 swings in a direction opposite to arrow A of FIG. 4. The cushion panel 30 is thereby moved from one position shown in FIG. 6 to another position as in FIG. 7. At this time, the slider 62 is slid into a front end portion of the slide base 58 from an intermediate portion thereof along the rail portion 58A of the slide base 58. This results in less resistance to swing and provides smoother operation than when the torsion spring 64 is directly held against the reverse of the cushion panel 30. In addition, the torsion spring 64 is prevented from experiencing plastic deformation. The cushion panel 30 then stops moving at the point where the urging forces of the torsion spring 64 and the tension spring 66 are balanced with loads of members, such as the cushion pad 26 and the cushion panel 30, plus the occupant's weight.

Furthermore, the cushion panel 30 has a desired curvilinear surface, thereby providing optimum seat pressure distribution for the occupant.

The hip point of a seated occupant is positioned substantially between the rear concave portion 30A and the intermediate convex portion 30B, although slightly displaced toward the former. One end portion 68A of the rear-linking member 68 is connected to the rear portion of the cushion panel 30 at a distance of about 50 mm from the hip point in the rearward direction of the vehicle. The cushion panel 30 is thereby successfully prevented from resonating sensitively with the sway of the occupant or vibrations imparted to the vehicle body from a roadway, as compared with the hip point being coincident with the above connected location between the rear-linking member 68 and the cushion panel 30. In addition, the connecting location is positioned in close proximity to rear corner portions of the cushion panel 30, thereby making the cushion panel 30 even more stable than when the connecting location lies in front of the hip point. This ensures that the occupant is seated in a stable state.

To be brief, the present embodiment uses a cushion panel 30, which has a desired curvilinear surface, and a cushion frame 32, which is provided with a pair of rear-linking members 68 at the opposite side portions 44A of the frame body 44 of the cushion frame 32, in which the cushion panel 30 and the cushion frame 32 are connected together at the rear portion of the cushion panel 30 on opposite sides thereof by means of the pair of rear-linking members 68 via a pair of tension springs 66 which has an urging force acting in the tension direction. Furthermore, apart from the pair of tension springs 66, the torsion spring 64 is disposed so that the cushion frame 32 and the cushion panel 30 are elastically held together in the vicinity of the front edge portion of the cushion panel 30. This spring arrangement makes it easier to identify the way in which each of the springs (namely, the torsion spring 64 and the pair of tension springs 66) effects the cushion panel 30 and yet the seat cushion 14. As a result, easy tuning can be carried out for each of the springs.

Moreover, the pair of tension springs 66, which has the urging force in the tension direction, acts on the pair of rear-linking members 68 which connects between the opposite side portions 44A of the frame body 44 of the cushion frame 32 and the opposite sides of the cushion panel 30 at the rear portion of the cushion panel 30. The tension spring 66 thereby exhibits a linear spring characteristic, which also can achieve easy tuning of the springs.

Furthermore, the springs (i.e., the torsion spring 64 and the pair of tension springs 66) are independent of each other, thereby allowing the springs to be mounted easily. In addition, the use of fewer springs than in conventional structures can contribute to making the front seat 10 lighter.

According to the present embodiment, the pair of rear-linking members 68 connects between the opposite sides of the cushion panel 30 and the opposite side portions 44A of the frame body 44 of the cushion frame 32 behind an occupant's hip point. The cushion panel 30 is thereby prevented from resonating with vibrations and the like, which are imparted to the vehicle body from a rough roadway when the vehicle runs thereon. Consequently, pitching can be avoided.

Furthermore, according to the present embodiment, the pair of tension springs 66 is used to elastically connect the frame body 44 of the cushion frame 32 and the cushion panel 30 at the rear portion of the cushion panel 30, thereby eliminating the need for elastically supporting the cushion panel 30 at the occupant's hip point. Consequently, the springs (i.e., the pair of tension springs 66) can be positioned at the opposite sides of the cushion panel 30. A space under a rear-central portion of the cushion panel 30 is thereby made available, so that an occupant seated in the rear of the vehicle may sit with legs stretched out wider.

In addition, according to the present embodiment, the linear portion 64A of the torsion spring 64 is held against the slider 62 which slides on the slide base 58. This results in less resistance to swing and provides smoother operation than when the linear portions 64A of the torsion spring 64 is directly held against the reverse side of the cushion panel 30. The seat cushion 14 is thereby permitted to acquire increased cushion ability around a front portion thereof. In addition, the torsion spring 64 can be prevented from being damaged by reverse plastic deformation and the like.

Figure 8:
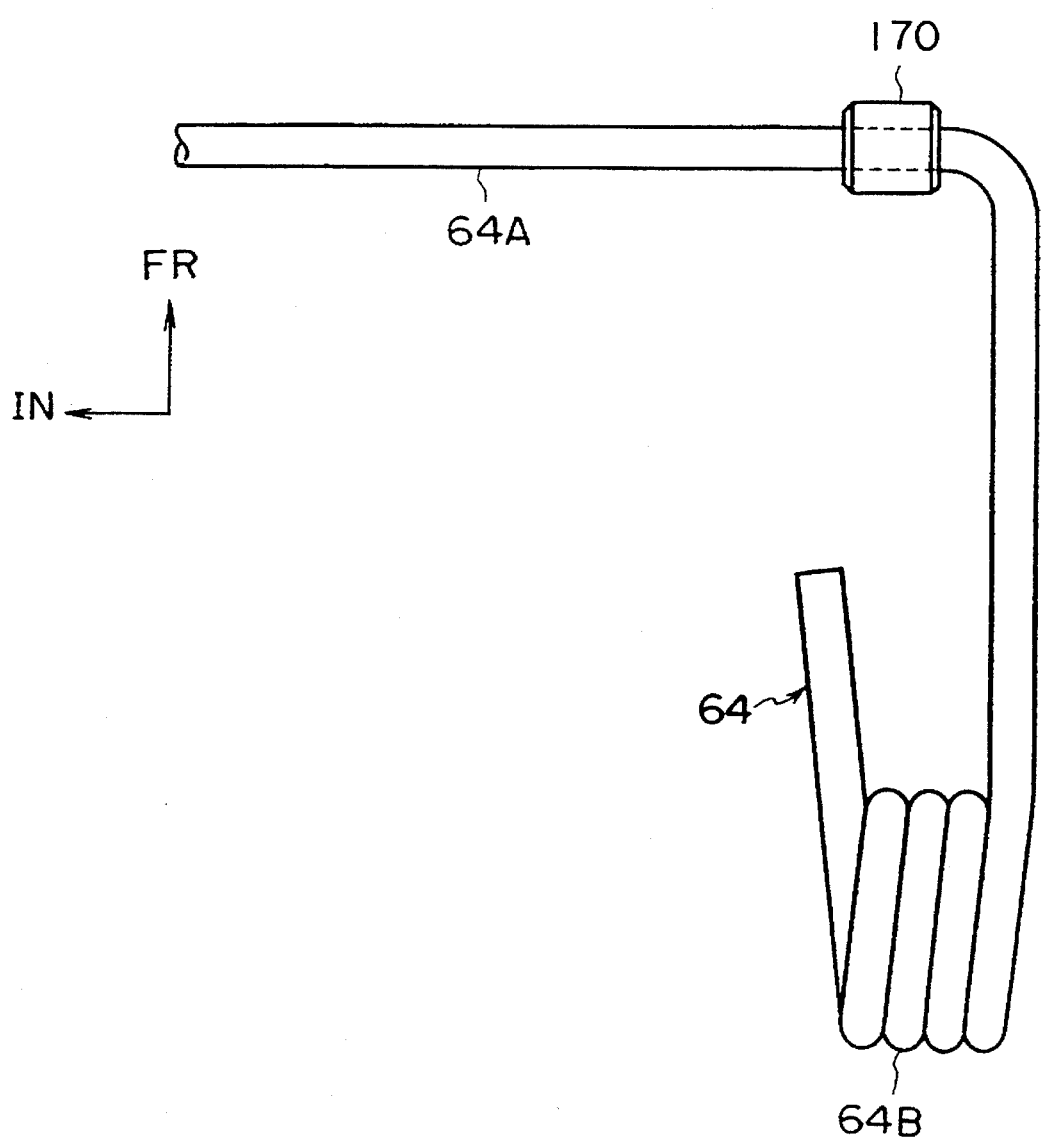
FIG. 8 is a plan view, illustrating a roller which remains fitted to a linear portion of the torsion spring, the roller being substituted for the slider of FIG. 5 through FIG. 7.
Figure 9:
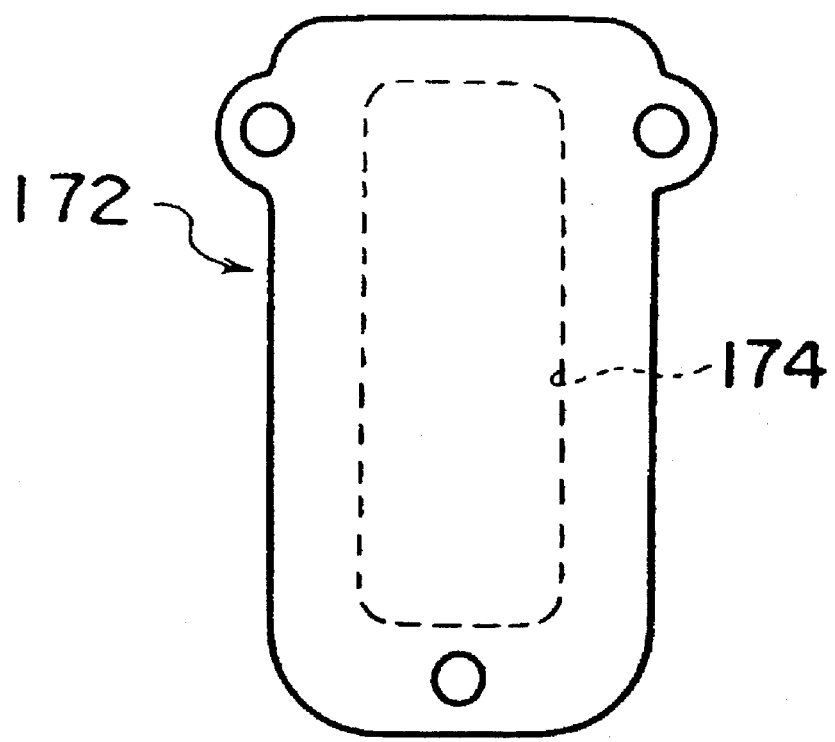
FIG. 9 is a plan view, illustrating a slide base which is formed with a concave portion for the roller of FIG. 8 to be positioned therein.

In the present embodiment, the linear portion 64A of the torsion spring 64 is held against the slider 62 which slides on the slide base 58. However, the present embodiment is not limited to the same, but may be varied as shown in FIGS. 8 and 9. According to such a variation, the linear portion 64A of the torsion spring 64 is fitted with cylindrical rollers 170 in close proximity to both end portions thereof in an axial direction of the linear portion 64A (i.e., in a transverse direction of the vehicle.) Each of the rollers 170 is positioned within a concave portion 174 which is formed in a slide base 172. In this structure, when elastic deformation occurs in the torsion spring 64, the roller 170 rolls within the concave portion 174 of the slide base 172 in the presence of only rolling friction. The variation thus offers advantages of less frictional resistance and smoother operation than when the slider 62 is used. In addition, the concave portion 174 may be formed simply at the slide base 172, and the roller 170 has a cylindrical shape, whereby a simplified structure with easy formation is achievable.

Figure 10:
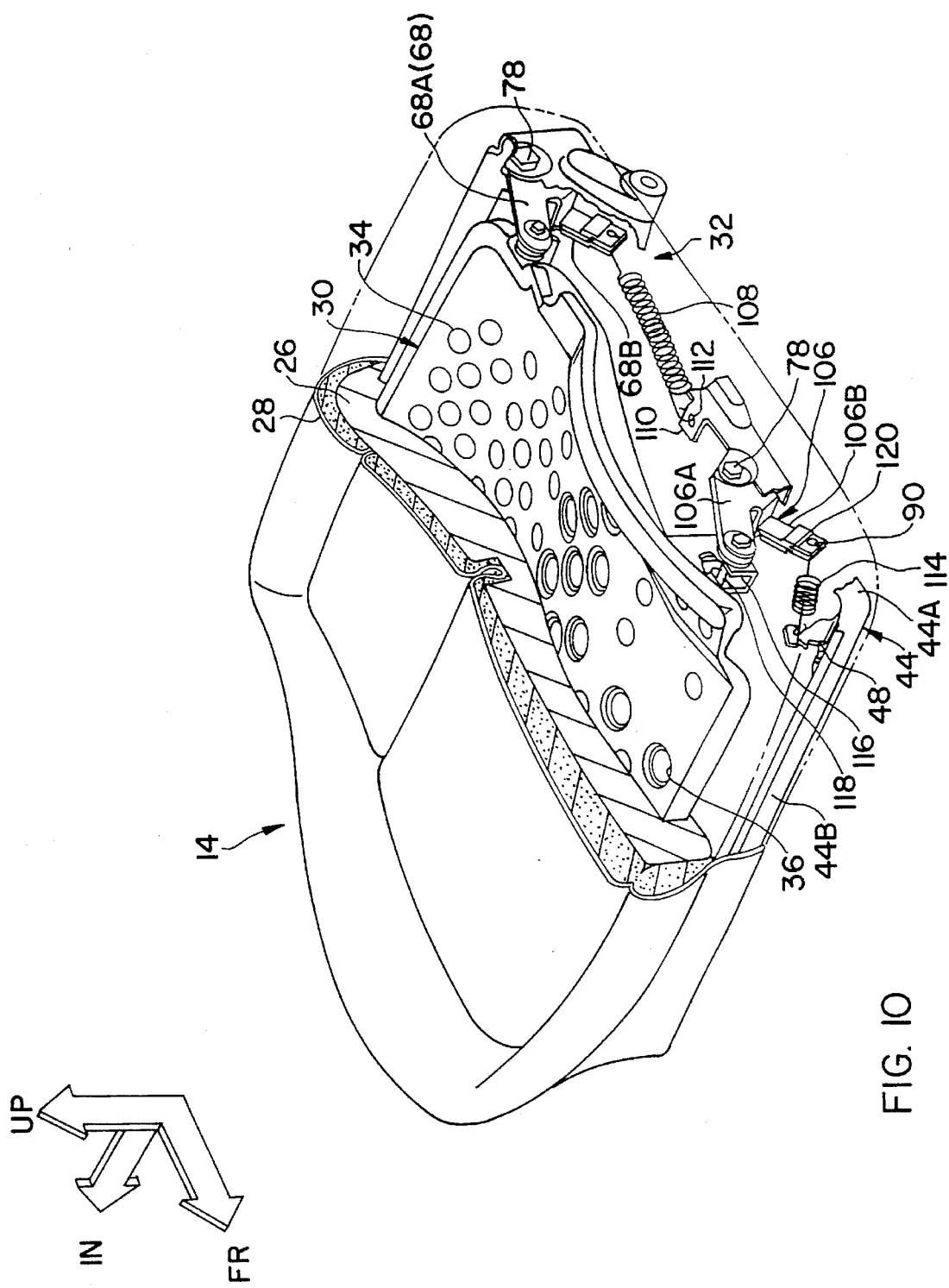
FIG. 10 is a perspective view, illustrating the seat cushion structure of FIG. 2, but with the torsion spring replaced by a pair of front-linking members according to a second embodiment.

A second embodiment of the present invention will now be described with reference to FIG. 10. Note that the same reference numerals are hereinafter given for components common to those described in the first embodiment; therefore, descriptions related thereto will be omitted.

The second embodiment is characterized in that a torsion spring 64 according to the first embodiment, as shown in FIG. 4, is replaced by a pair of front-linking members 106, which is identical in construction to a pair of rear-linking members 68. A tension spring 108 is formed by a single coiled spring, of which one end is secured to the other end portion 68B of each of the pair of rear-linking members 68. The other end of the tension spring 108 is held against a circular hole 112 of a bent portion 110, which is formed at each side portion 44A of a frame body 44. Each of the pair of the front-linking members 106 includes one end portion 106A and the other end portion 106B, the latter being fitted with a spring-holding bracket 90. A tension spring 114 has less tension than the tension spring 108. One end of the tension spring 114 is held against the spring-holding bracket 90, while the other end thereof is held against a holding portion 48C of a spring-holding portion 48.

The one end portion 106A of the front-linking member 106 is connected to a bracket 116. (Note that FIG. 10 shows a partly cutaway portion of the bracket 116.) The bracket 116 is mounted under a front portion of a cushion panel 30 so as to serve as a slide base 58 which is shown in FIG. 5. The bracket 116 is formed with an elongated hole 118 which allows relative movement of a bolt 120 with respect to the bracket 116 therein. The bolt 120 has a circumferentially smooth surface at an intermediate portion thereof in an axial direction of the bolt 120. This arrangement ensures that the bracket 116 acts as a slider 62 that is shown in FIG. 5.

The present embodiment offers features and benefits similar to those of the above-described first embodiment. Furthermore, the present embodiment provides easier tuning for each of the springs than in the first embodiment because the present embodiment uses the tension spring 114, which acts on the front-linking member 106, as well as the tension spring 108 that acts on the rear-linking member 68. Each of the tension springs 108 and 114 have a different urging force which acts in a tension direction.

Next, a third embodiment of the present invention will be described with reference to FIG. 11 through FIG. 15. Similarly, the same reference numerals are hereinafter given for components common to those described in the first and second embodiments; therefore, descriptions related thereto will be omitted.

Figure 11:
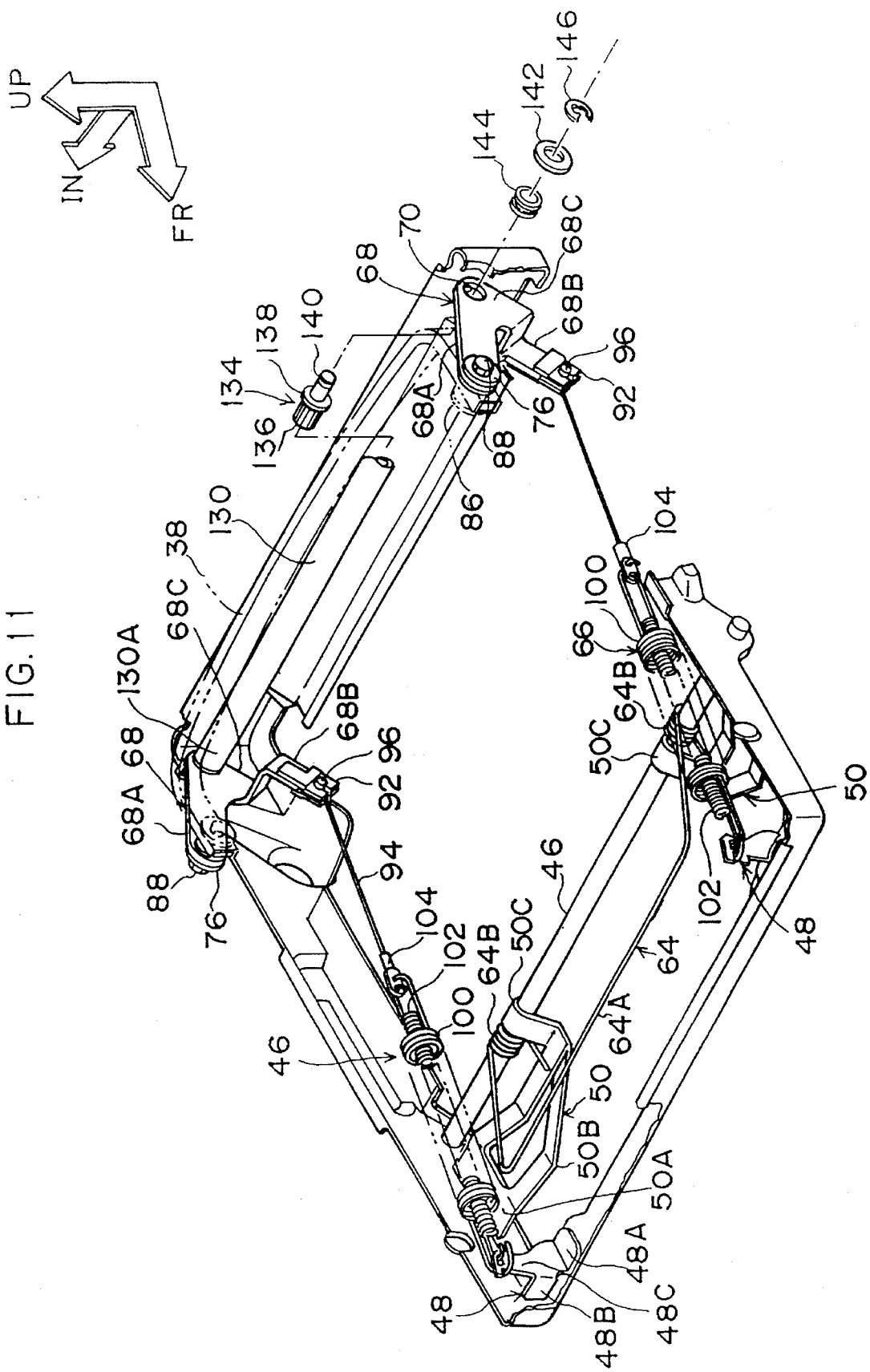
FIG. 11 is a perspective view, illustrating the cushion frame of FIG. 4, but with the pair of rear-linking members being connected together via a connecting rod in accordance with a third embodiment.
Figure 12:
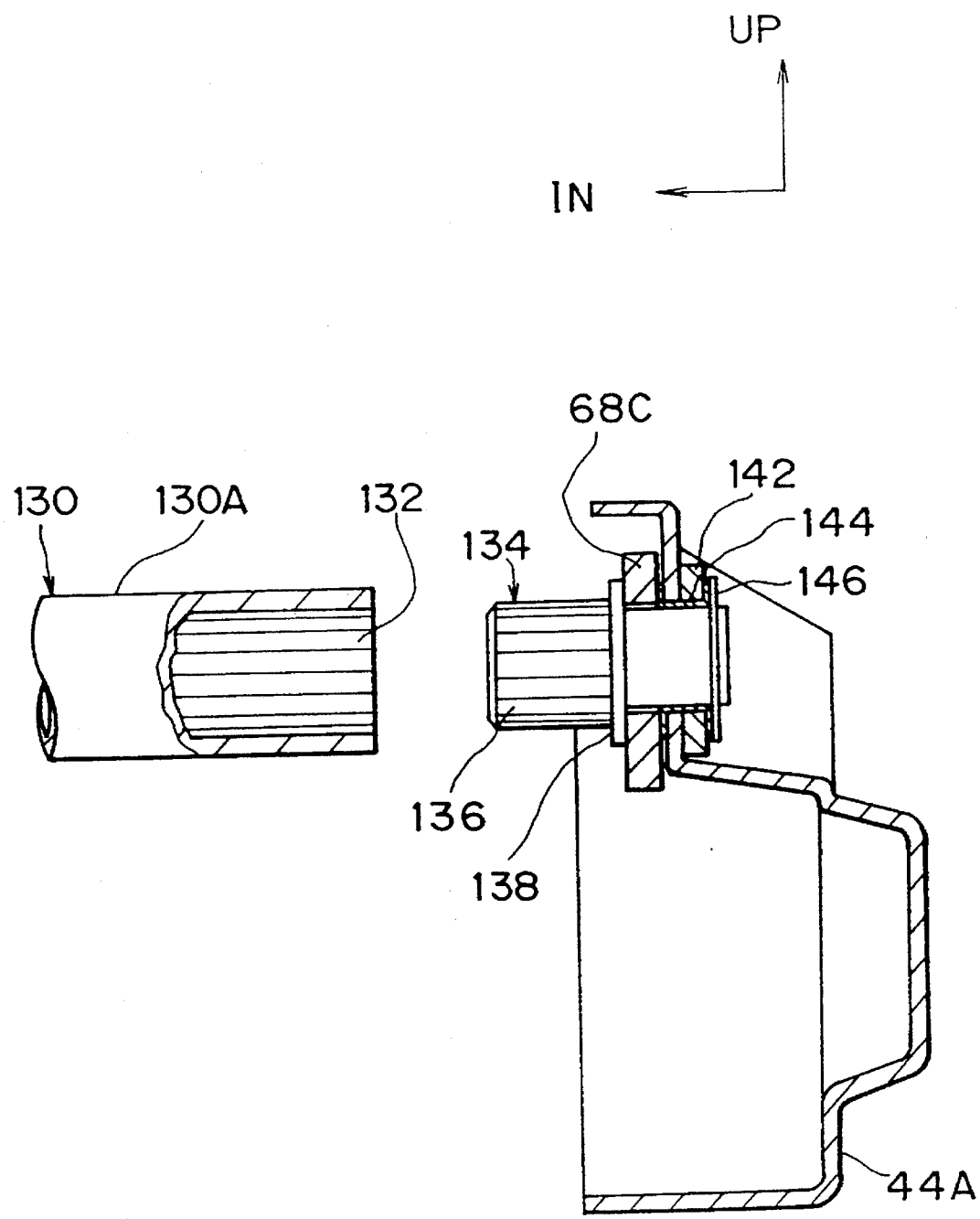
FIG. 12 is a cross-sectional view, showing a construction for connecting between the rear-linking member and one end portion of the connecting rod, both of which are shown in FIG. 11.

FIGS. 11 and 12 illustrate a structure according to the present embodiment, in which a pair of rear-linking members 68 is connected together via a connecting rod 130 at a rotation axis of the pair of rear-linking members 68. As shown in FIG. 12, each end portion 130A of the connecting rod 130 in an axial direction thereof is formed with a serration 132 at an inner-circumferential surface of the end portion 130A. A head portion of a hinge pin 134 fits within the connecting rod 130, with the serration 132 of the connection rod 130 being held in relatively tight engagement with a serration 136 which is formed at the head portion of the hinge pin 134. A circular washer 138 is anchored to an intermediate portion of the hinge pin 134 in the axial direction of the hinge pin 134. The washer 138 is further welded to an inner surface of a base portion 68C of the rear-linking member 68. The hinge pin 134 thereby rotates in union with the rear-linking member 68. One end portion of the hinge pin 134 in the axial direction thereof is formed with a single groove 140 (see FIG. 11) at a circumferential surface of the above end portion of the hinge pin 134. This end portion of the hinge pin 134 extends through a bush 144 that will be described below.

As illustrated in FIG. 12, a flat washer 142 is welded to an outer surface of each side portion 44A of a frame body 44, thereby ensuring a contact surface at the circumferential surface of the hinge pin 134. A bush 144, which has a spool form and is made of a resin or copper material, is fitted between the side portion 44A of the frame body 44 and the flat washer 142. The hinge pin 134 extends through the bush 144, with a E-ring 146 being held in engagement with the groove 140 of the hinge pin 134. The hinge pin 134 is thereby prevented from breaking loose therefrom. Alternatively, the E-ring 146 may be replaced by a nut, with the intermediate portion of the hinge pin 134 in the axial direction thereof being shaped into a stepped bolt. The nut is thereby engaged with such a stepped bolt-shaped portion of the hinge pin 134.

The operation of the present embodiment will be described hereinbelow.

The hinge pins 134 are used to swingably support the pair of rear-linking members 68. The pair of hinge pins 134 is connected together via the connecting rod 130. In addition, the connecting rod 130 as well as the pair of hinge pins 134 are formed with serrations 132 and 136 respectively in order to prevent rotation angles of the rear-linking members 68 from differing from one another. As a result, the pair of rear-linking members 68 pivots synchronously at a angle common to one another.

Figure 13:
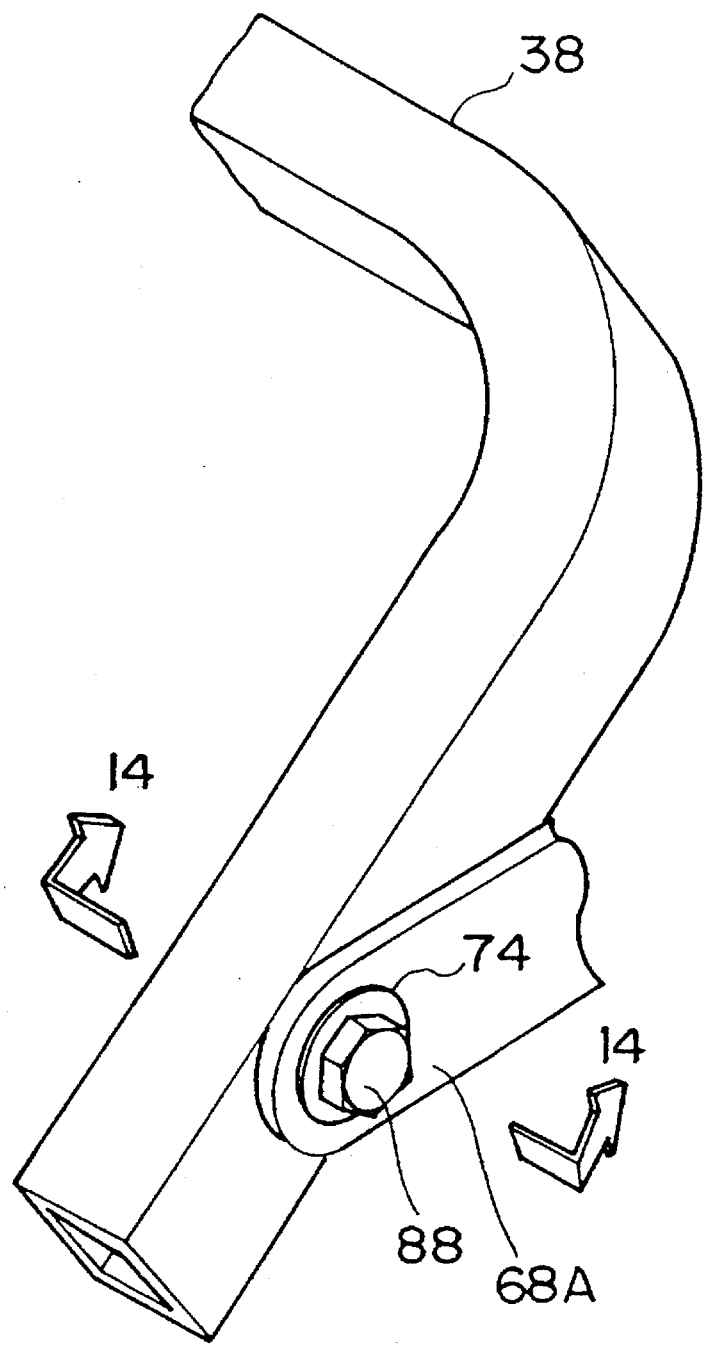
FIG. 13 is a perspective view, showing a reinforcing member and the rear-linking member, the latter being connected to one end portion of the former, in order to illustrate the operation of the third embodiment shown in FIGS. 11 and 12.

Further details of the above will now be given with reference to FIG. 13 through FIG. 15. FIGS. 13 and 14 illustrate an arrangement in which a bolt 88 and a collar 74 are connected to one end portion 68A of the rear-linking member 68, with small gaps 148 and 150 (see FIG. 14) being provided therebetween. The pair of rear-linking members 68 thereby pivots freely when connected to each end portion of a reinforcing member 38 without the connecting rod 130. The gap 148 is provided between a circumferential surface of a screw thread portion of the bolt 88 and an inner-circumferential surface of the collar 74. The gap 150 is provided between an inner surface of an outer wall portion of the collar 74 and an outer surface of the one end portion 68A of the rear-linking member 68. Thus, the bolt 88 is movable only by the limited amounts of the gaps 148 and 150. (For convenience of description, the bush 76 and the flat washer 80 have been omitted in FIG. 14.) Referring to FIG. 15, when a vehicle takes a curve in the road, an occupant's center of gravity is shifted by inertial force which acts on the occupant in the direction of arrow G. One of the bolts 88, which is disposed in the direction in which the inertial force acts, thereby tends to move in a direction in which an axis between a pair of bolts 88 is forced downward.

At the same time, the other of the bolts 88, which is disposed in a direction opposite to the action of the inertial force, is urged into movement in a direction in which the above-noted axis is forced upward. The cushion panel 30, which forms a supporting surface of a seat cushion 14, is thereby likely to experience a subtle roll about a longitudinal axis of the vehicle. In this case, a top half of the occupant's body tends to sway, which is unacceptable for some. In order to eliminate such rolling, the gaps 148 and 150 may be made closer to one another. However, this requires stringent precision in dimensions for each component, with a concomitant rise in cost thereof. The result is a fall in productivity which is expected in mass production.

The present embodiment offers a solution to avoid such a phenomenon, in which each of the rear-linking members 68 is pivotably supported by the hinge pin 134, of which the circumferential surface is formed with the serration 136, the rear-linking member 68 and hinge pin 134 being connected together via the connecting rod 130 of which each end portion is formed with the serration 132 at the inner-circumferential surface thereof. In this structure, when a phase retardation is just about to occur between the pair of rear-linking members 68, torque, which acts in a direction in which the phase retardation is eliminated, is imparted to the serrations 132 and 136, respectively, of the connecting rod 130 and the hinge pin 134. The pair of rear-linking members 68 is thereby permitted to swing synchronously, with the gaps 148 and 150 remaining unchanged. Accordingly, the above-mentioned rolling can be eliminated without the need for demanding accuracy of component dimensions.

Figure 16:
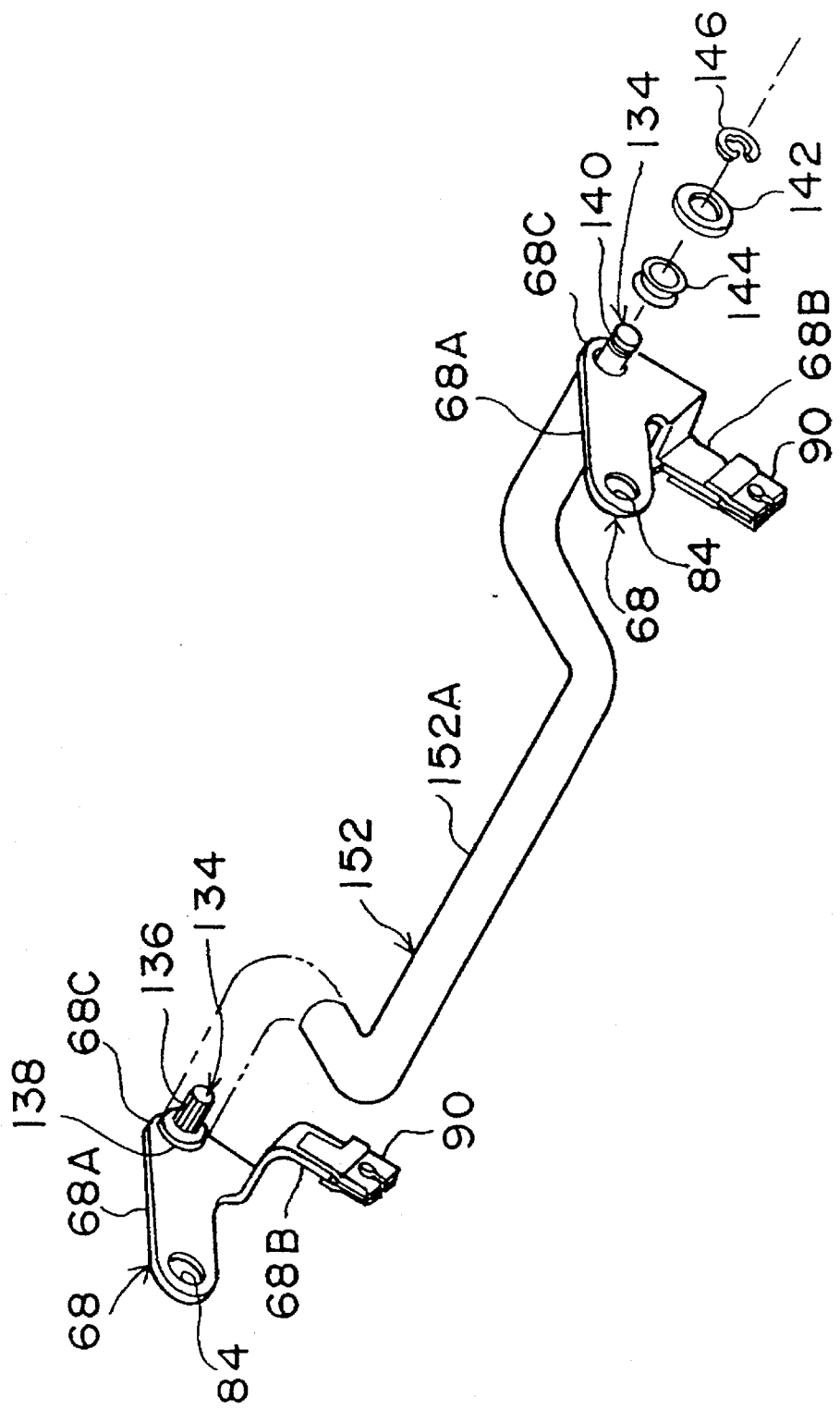
FIG. 16 is a perspective view, illustrating the connecting rod of FIG. 11, but with an intermediate portion thereof being bent in the forward direction of a vehicle according to a fourth embodiment.

Next, a fourth embodiment of the present invention will be described with reference to FIG. 16. Similarly, the same reference numerals are hereinafter given for components common to those described in the first embodiment through the third embodiment; therefore, descriptions related thereto will be omitted.

The present embodiment provides a further improvement with a connecting rod 130 as is shown in FIGS. 11 and 12.

According to the present embodiment, a pair of rear-linking members 68 is connected together via a connecting rod 152, of which an intermediate portion in an axial direction thereof is bent into a substantially U-shape in the forward direction of the vehicle. The use of the connecting rod 152 provides the same operation and benefits as those in the above-described third embodiment. The connecting rod 152 offers a further advantage in which an occupant seated in the rear of the vehicle can sit with legs stretched out wider because a bent portion 152A, which is formed at the intermediate portion of the connecting rod 152 in the axial direction thereof, does not preclude the use of space under a rear portion of a seat cushion 14.

Figure 17:
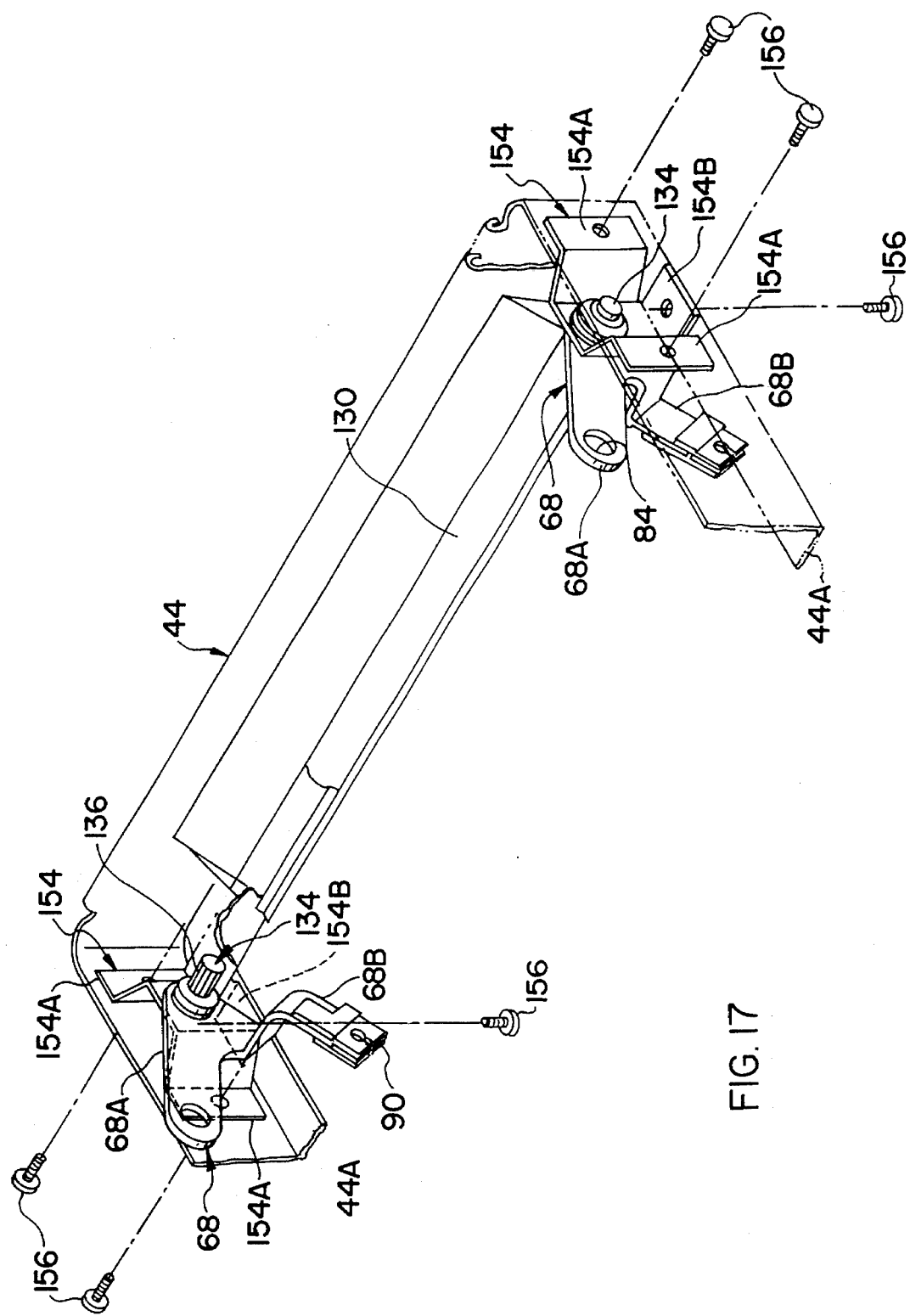
FIG. 17 is a perspective view, showing a rear portion of the cushion frame of FIG. 11 according to the third embodiment, but with a pair of mounting brackets disposed therein in accordance with a fifth embodiment, in order to facilitate the mounting of the connecting rod therebetween.

A fifth embodiment of the present invention will now be described with reference to FIG. 17. Similarly, the same reference numerals are hereinafter given for components common to those described in the first embodiment through the fourth embodiment; therefore, descriptions related thereto will be omitted.

The present embodiment is characterized by a pair of additional mounting brackets 154 being provided at opposite side portions 44A of a frame body 44.

Each of the mounting brackets 154, which has a substantially rectangular shape, is formed with a through-hole at an intermediate portion thereof so that a rear-linking member 68 is swingably supported by a hinge pin 134. The mounting bracket 154 includes a pair of side-mounting portions 154A at opposite end portions thereof. The pair of side-mounting portions 154A is disposed directly on an inner wall surface of the side portion 44A of the frame body 44 so as to be fixed thereto by means of bolts 156. The mounting bracket 154 further includes a lower-mounting portion 154B at the intermediate portion thereof, which is bent toward the side portion 44A of the frame body 44. The lower-mounting portion 154B is disposed directly on a base surface of the side portion 44A of the frame body 44 so as to be anchored thereto by means of the bolt 156. Furthermore, an unillustrated welded nut is tightly secured to each surface of the side-mounting portions 154A and the lower-mounting portion 154B. Alternatively, the lower-mounting portion 154B may be bent in a direction opposite to the side portion 44A of the frame body 44, if a base surface of the side portion 44A has a larger width in the inward direction of the frame body 44 than that shown in FIG. 17.

In the above-described construction, the connecting rod 130 is initially connected to both of the hinge pins 134 which swingably support a pair of rear-linking members 68. With these two members being held together, each of the mounting brackets 154 is then positioned thereon in such a way that the pair of side-mounting portions 154A and the lower-mounting portion 154B are held against the side portion 44A of the frame body 44. Then, the pair of mounting brackets 154 can be fixed to the frame body 44 by means of the bolts 156. The present embodiment thus provides easy mounting of the connecting rod 130.

In addition, the connecting rod 130 can readily be replaced by another. The connecting rod 130 can be made lighter or heavier to a small degree by, for example, only increasing or decreasing the diameter of the connecting rod 130, provided that the serrations 136 and 132, respectively, of the hinge pin 134 and the connecting rod 130 have an unchanged number of keyways. As a result, easy tuning, which is different from spring tuning, is achievable according to the occupant's personal preferences for the front seat which, for example, stands at a halfway point between a totally rolling-free front seat and another front seat having some roll.

Needless to say, the present embodiment also provides operation and benefits similar to those of the third embodiment.

A sixth embodiment of the present invention will now be described with reference to FIG. 18. Similarly, the same reference numerals are hereinafter given for components common to those described in the first embodiment through the fifth embodiment; therefore, descriptions related thereto will be omitted.

According to the present embodiment, one end portion 68A of each rear-linking member 68 is formed with a pair of cut-out portions 158, which is directed in a direction perpendicular to one another. In addition, each end portion 160A of a torsion spring 160, which is bent into a L-shape with respect to an axial direction of the torsion spring 160, is provided through the pair of cut-out portions 158 so as to be held thereagainst.

In this construction, a pair of rear-linking members 68 is pivotably supported, but is not connected together via a connecting rod 130. However, the connecting rod 130 may be used in conjunction therewith.

Figure 18:
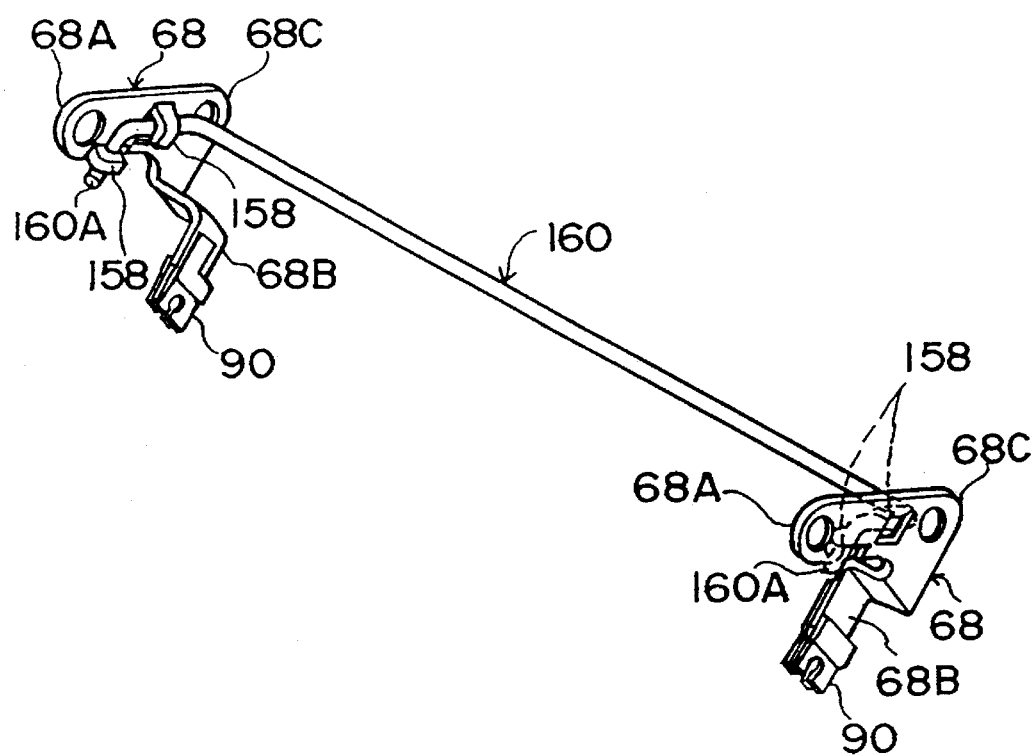
FIG. 18 is a perspective view, showing a torsion spring according to a sixth embodiment, which is substituted for the connecting rod of FIG. 16; and, FIG. 19 is a perspective view, showing a conventional seat cushion structure.
Figure 19:
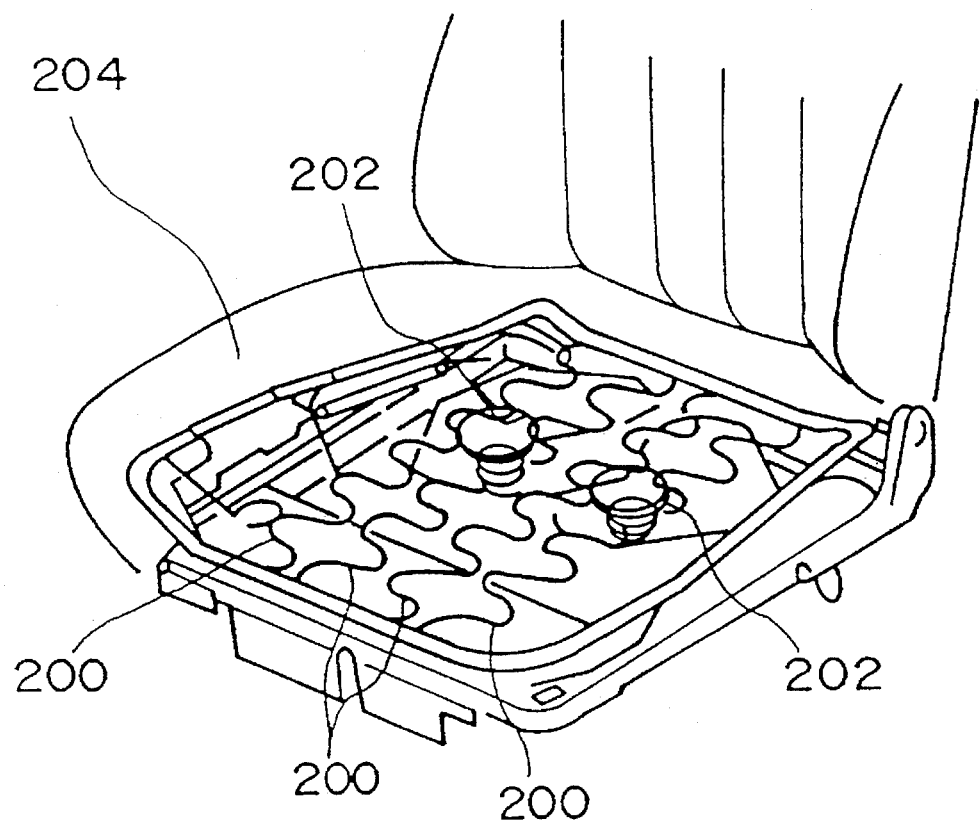

In the construction according the present embodiment, the torsion spring 160 shown in FIG. 18 is in a normal condition without any urging force generated therein. However, when a minor phase retardation occurs in rotation angles of the pair of rear-linking members 68 (namely, when the rotation angles of these two members differ from one another), the torsion spring 160 is twisted, thereby producing the urging force in the torsion spring 160. As a consequence, the pair of rear-linking members 68 can swing synchronously in the same way as in the third embodiment.

What is claimed is:

1. A seat cushion structure for use in a vehicle front seat, comprising:

a cushion portion, on which an occupant sits;

a supporting panel constructed and arranged to have a curved surface forming a supporting surface for an occupant seated on said cushion portion, said supporting panel being overlaid with said cushion portion such that said supporting panel and said cushion portion are assembled together;

a supporting member, which extends around the outer-lower periphery of said cushion portion so as to support said supporting panel;

a first connecting means including a first torsion spring which is movable relative to said supporting panel, which elastically connects said supporting panel and said supporting member in the vicinity of a front edge portion of said supporting panel;

a pair of second connecting means being swingably supported at a rear portion of said supporting member to pivot respectively about a fulcrum, and pivotably connecting said supporting member and said supporting panel, wherein a first end portion of said second connecting means is pivotally connected to a corresponding side portion of said supporting panel, and a second end portion of said second connecting means being subjected to an urging force in a tension direction; and urging means disposed between said second end portion of said second connecting means and said supporting member to urge said second end portion of said second connecting means in the tension direction, said urging means being constructed and arranged to exhibit a linear spring characteristic.

2. A seat cushion structure according to claim 1, further comprising: a connecting member being spanned between said pair of second connecting means.

3. A seat cushion structure according to claim 1, wherein said first connecting means includes at least one movable piece, said at least one movable piece is positioned at a location where said first torsion spring is urged into contact with said supporting panel, and said at least one movable piece is held in the vicinity of said front edge portion of said supporting panel so as to be slidable in response to an amount of elastic deformation of said first torsion spring.

4. A seat cushion structure according to claim 1, wherein said first connecting means includes at least one cylindrical member, said at least one cylindrical member is positioned at a location where said first torsion spring is urged into contact with said supporting panel, and said at least one cylindrical member is held in the vicinity of said front edge portion of said supporting panel so as to be rotatable in response to an amount of elastic deformation of said torsion spring.

5. A seat cushion structure according to claim 1, wherein end portions of said pair of second connecting means are connected to said supporting panel at a location in a rearward direction of said vehicle front seat from a hip point.

6. A seat cushion structure according to claim 2, wherein said first connecting means includes at least one movable piece, said at least one movable piece being positioned at a location where said first torsion spring is urged into contact with said supporting panel, and said at least one movable piece is held in the vicinity of said front edge portion of said supporting panel so as to slidable depending upon an amount of elastic deformation of said first torsion spring.

7. A seat cushion structure according to claim 2, further comprising: a pair of brackets having a substantially rectangular cross-section respectively, wherein both end portions of said brackets are fixed at respective locations of both side portions of said supporting member at vicinities of a rear edge portion so that respective intermediate portions of said brackets rotatably support said pair of second connecting means respectively and so that said pair of second connecting means is supported to said supporting member.

8. A seat cushion structure according to claim 2, wherein said connecting member is formed such that both end portions of said connecting member are cylindrical and an inner circumferential portion of said connecting member is serrated.

9. A seat cushion structure according to claim 1, further comprising:
a second torsion spring connecting said pair of second connecting means and permitting said pair of second connecting means to pivot synchronously at an angle common to one another.

10. A seat cushion structure according to claim 4, wherein said pair of first linking members are respectively formed so as to be substantially L-shaped.

11. A seat cushion structure for use in a vehicle front seat, comprising:
a cushion portion, on which an occupant sits;
a supporting panel constructed and arranged to form a supporting surface for an occupant seated on said cushion portion, said supporting panel being overlaid with said cushion portion such that said supporting panel and said cushion portion are assembled together;
a supporting member, which extends around an outer-lower periphery of said cushion portion so as to support said supporting panel;
first connecting means including a pair of a first linking members being swingably supported at an intermediate portion of said supporting member, in which a first end portion of each of said pair of first linking members is rotatably supported to said supporting panel, and a second end portion thereof being subjected to an urging force in a tension direction,
a first tension spring being supported between a front portion of said supporting member and said second end portion of said first connecting means;
a pair of second connecting means being swingably supported to a rear portion of said supporting member to pivot respectively about a fulcrum, and pivotally connecting said supporting member and said supporting panel, wherein a first end portion of said second connecting means is pivotably connected to a corresponding side portion of said supporting panel, and a second end portion of said second connecting means is subjected to an urging force in a tension direction; and
a second tension spring being supported between said second end of said second connecting means and an intermediate side portion of said supporting member to urge said second end portion of said second connecting means in the tension direction, said second tension spring being constructed and arranged to exhibit a linear spring characteristic.

12. A seat cushion structure according to claim 4, further comprising:

a torsion spring connecting said pair of second connecting means and permitting said pair of second connecting means to pivot synchronously at an angle common to one another.

13. A seat cushion structure for use in a vehicle front seat, comprising:
a cushion portion, on which an occupant sits;
a supporting panel constructed and arranged to have a curved surface forming a supporting surface for an occupant seated on said cushion portion, said supporting panel being overlaid with said cushion portion such that said supporting panel and said cushion portion are assembled together;
a cushion frame, which extends around the outer-lower periphery of said cushion portion so as to support said supporting panel;
connecting means including spring means, which elastically connects said supporting panel in the vicinity of a front edge of said supporting panel and an intermediate portion of said cushion frame, and is movable relative to said cushion frame;
a pair of first linking members swingably disposed at a rear portion of said cushion frame so as to pivot respectively about a fulcrum, and pivotally connecting said supporting member and said supporting panel, wherein a first end portion of said first linking member is rotatably supported on a corresponding side portion of said supporting panel, and a second end portion of said first linking member being subjected to an urging force in a tension direction; and,
a first tension spring connected to said second end portion of said first linking member and said cushion frame to urge said first linking member in the tension direction, said urging means being constructed and arranged to exhibit a linear spring characteristic.

14. A seat cushion structure according to claim 13, further comprising: a spanning member, which spans between said respective fulcrum of said pair of first linking members.

15. A seat cushion structure according to claim 13, wherein said spring means is comprised of a first torsion spring, and said connecting means includes at least one movable piece, said at least one movable piece being positioned at a location where said first torsion spring is urged into contact with said supporting panel, and said at least one movable piece is held in the vicinity of said front edge portion of said supporting panel so as to be slidable in response to an amount of elastic deformation of said torsion spring.

16. A seat cushion structure according to claim 13, wherein said connecting means includes a pair of second linking members, in which one end portion of each of said second linking members is rotatably supported by said supporting panel, the other end portion thereof being connected to a second tension spring which is mounted to said connecting means, and an intermediate portion of said second linking member is rotatably supported by said cushion frame.

17. A seat cushion structure according to claim 13, wherein said spring means is comprised of a first torsion spring and, said connecting means includes at least one roller, said at least one roller being positioned at a location where said first torsion spring is urged into contact with said supporting panel, and said at least one roller is held in the vicinity of said front edge portion of said supporting panel so as to be rotatable in response to an amount of elastic deformation of said first torsion spring.

18. A seat cushion structure according to claim 13, wherein said supporting panel is shaped as a desired curved surface forming a supporting surface for an occupant seated on said cushion portion.

19. A seat cushion structure according to claim 13, wherein end portions of said pair of first linking members are connected to said supporting panel at a location in a rearward direction of said vehicle front seat from a hip point.

20. A seat cushion structure according to claim 14, wherein said spring means is comprised of a first torsion spring and, said connecting means includes at least one movable piece, said at least one movable piece being positioned at a location where said first torsion spring is urged into contact with said supporting panel, and said at least one movable piece is held in the vicinity of said front edge portion of said supporting panel so as to be slidable depending upon an amount of elastic deformation of said first torsion spring.

21. A seat cushion structure according to claim 14, further comprising: a pair of mounting brackets having a substantially rectangular cross-section respectively, wherein both end portions of said mounting brackets are fixed at respective locations of both side portions of said cushion frame so that respective intermediate portions of said mounting brackets support corresponding ones of said pair of first linking members rotatably about said respective fulcrums of said pair of first linking members and so that said pair of first linking members is supported to said cushion frame.

22. A seat cushion structure according to claim 14, wherein said spanning member is formed such that a shaft axis thereof corresponds with a line which spans between said fulcrums of said pair of first linking members.

23. A seat cushion structure according to claim 14, wherein said spanning member is formed into a substantially cylindrical shape such that an intermediate portion of said spanning member is positioned in a forward direction of the vehicle in relation to both end portions of said spanning member when said spanning member is provided between said pair of first linking members.

24. A seat cushion structure according to claim 14, further comprising: a second torsion spring connecting said pair of first linking members and preventing respective angles of rotation of said pair of first linking members from deviating.

25. A seat cushion structure according to claim 14, wherein said spring means is comprised of a first torsion spring, and said connecting means includes at least one roller, said at least one roller being positioned at a location where said first torsion spring is urged into contact with said supporting panel, and said at least one roller is held in the vicinity of said front edge portion of said supporting panel so as to be rotatable in response to an amount of elastic deformation of said first torsion spring.

26. A seat cushion structure according to claim 14, wherein said spanning member is formed such that both end portions of said spanning member are cylindrical and an inner circumferential portion of said spanning member is serrated.

27. A seat cushion structure according to claim 20, further comprising:
a second torsion spring connecting said pair of first linking members and preventing respective angles of rotation of said pair of first linking members from deviating.

28. A seat cushion structure according to claim 13, further comprising:
a second torsion spring connecting said pair of first linking members and preventing respective angles of rotation of said pair of first linking members from deviating.

29. A seat cushion structure according to claim 16, further comprising: a second torsion spring connecting said pair of first linking members and preventing respective angles of rotation of said pair of first linking members from deviating.

30. A seat cushion structure according to claim 16 wherein said pair of second linking members are respectively formed so as to be substantially L-shaped.

31. A seat cushion structure for use in a vehicle seat, comprising: a cushion portion on which an occupant sits; a supporting panel constructed and arranged to have a curved surface forming a supporting surface for the occupant, said supporting panel being overlaid with said cushion portion; a supporting member, which extends around an outer-lower periphery of said cushion portion so as to support said supporting panel; a pair of links supporting said cushion portion so that said cushion portion is freely movable in vertical directions of a vehicle; and urging means for applying tensile force to areas between respective predetermined areas of said links and a predetermined area of said supporting member so that said cushion portion is urged upward via said links; wherein each of said pair of links is formed in a substantial L-shape and is provided at a respective side portion of said cushion portion, a corner portion provided at an intermediate portion of each of said pair of links being supported to said supporting member so as to rotate freely, one end portion of each of said pair of links being attached to said cushion portion so as to rotate freely, and another end portion of each of said links being attached to one end of said urging means provided respectively at both side portions of said cushion portion.

32. A seat cushion structure according to claim 31, wherein each of said pair of links has a first arm portion between said one end portion and said corner portion and has a second arm portion between said another end portion and said corner portion, and when an occupant is seated on said cushion portion, a longitudinal direction of said first arm portion becomes substantially horizontal and a longitudinal direction of said second arm portion becomes substantially vertical.

33. A seat cushion structure according to claim 31, further comprising: a torsion spring connecting said pair of links permitting said pair of links to pivot synchronously at an angle common to one another.

34. A seat cushion structure according to claim 31, further comprising: a connecting member, which spans between respective fulcrums of said pair of links.

35. A seat cushion structure according to claim 34, wherein said connecting member is formed such that both end portions of said connecting member are cylindrical and an inner circumferential portion of said connecting member is serrated.

36. A seat cushion structure according to claim 32, further comprising: a connecting member, which spans between respective fulcrums of said pair of links.

37. A seat cushion structure according to claim 36, wherein said connecting member is formed such that both end portions of said connecting member are cylindrical and an inner circumferential portion of said connecting member is serrated.

* * * * *